(12) United States Patent  (10) Patent No.: US 8,892,670 B2
Chakravarthy et al.  (45) Date of Patent: Nov. 18, 2014

(54) COLLABORATIVE, CONTEXTUAL ENTERPRISE NETWORKING SYSTEMS AND METHODS

(75) Inventors: Sriram Chakravarthy, Saratoga, CA (US); Gopala Janjanam, Sunnyvale, CA (US); Madhav Vodnala, San Jose, CA (US); Chih-Ming Yi, Los Altos, CA (US); Weiwen Weng, Sunnyvale, CA (US)

(73) Assignee: TIBCO Software Inc., Palo Alto, CA (US)

( * ) Notice: Subject to any disclaimer, the term of this patent is extended or adjusted under 35 U.S.C. 154(b) by 85 days.

(21) Appl. No.: 13/594,589

(22) Filed: Aug. 24, 2012

(65) Prior Publication Data

US 2013/0179494 A1  Jul. 11, 2013

Related U.S. Application Data

(60) Provisional application No. 61/526,818, filed on Aug. 24, 2011, provisional application No. 61/565,284, filed on Nov. 30, 2011.

(51) Int. Cl.
| | | |
|---|---|---|
| *G06F 15/16* | (2006.01) | |
| *H04L 29/06* | (2006.01) | |
| *H04N 21/488* | (2011.01) | |
| *H04N 21/81* | (2011.01) | |
| *H04N 21/80* | (2011.01) | |
| *H04L 29/12* | (2006.01) | |
| *G06Q 10/10* | (2012.01) | |

(52) U.S. Cl.
CPC ............ *H04L 67/42* (2013.01); *H04N 21/4886* (2013.01); *H04N 21/8126* (2013.01); *H04N 21/80* (2013.01); *H04L 61/1588* (2013.01); *G06Q 10/101* (2013.01)

USPC ......... 709/206; 709/207; 715/745; 705/14.66

(58) Field of Classification Search
CPC ..................... H04L 12/2856; H04L 12/08972; H04L 12/12188; H04L 29/08972; H04L 29/12188; H04L 45/306; H04L 61/1588; H04N 21/4886; H04N 21/8126; H04N 21/80; G06F 11/0745; G06F 17/30699; G06F 17/30702; G06F 17/30867
USPC ................. 709/204, 217, 218, 219, 206, 207; 707/600, 749, 743; 717/171; 715/751, 715/745; 706/12; 705/14.54, 14.66; 455/410
See application file for complete search history.

(56) References Cited

U.S. PATENT DOCUMENTS 8,311,513 B1 * 11/2012 Nasserbakht et al. ........ 455/410
2007/0255781 A1    11/2007 Li et al.

(Continued)

OTHER PUBLICATIONS

Uniform resource locator ("URL") www.facebook.com.

(Continued)

*Primary Examiner* — Le H Luu
(74) *Attorney, Agent, or Firm* — Baker & McKenzie LLP

(57) ABSTRACT

Described is an enterprise-based, contextual network system and method to keep employees connected with one another, as well as to external resources. Current media offers a great way to stay in touch with others but is not cohesive and contextual for businesses or generally productive for businesses. The enterprise media disclosed in this application presents a way for businesses to keep all of their employees and outside resources connected, but in a professional and efficient manner for the workplace. This enterprise media adapts to its users to create an interface that will help the user complete work, connect with others, and use various applications all in one place.

16 Claims, 25 Drawing Sheets

(56) References Cited

U.S. PATENT DOCUMENTS

| | | |
|---|---|---|
| 2008/0086534 A1 | 4/2008 | Bardek et al. |
| 2009/0222448 A1 | 9/2009 | Caldwell et al. |
| 2009/0249321 A1* | 10/2009 | Mandyam et al. ............ 717/171 |
| 2009/0300098 A1 | 12/2009 | Martin et al. |
| 2010/0062840 A1 | 3/2010 | Herrmann |
| 2010/0069092 A1 | 3/2010 | Ratan et al. |
| 2010/0082695 A1 | 4/2010 | Hardt |
| 2011/0055194 A1 | 3/2011 | Ghosh |
| 2011/0099142 A1* | 4/2011 | Karjalainen et al. .......... 707/600 |
| 2011/0238755 A1* | 9/2011 | Khan et al. .................... 709/204 |
| 2011/0302504 A1* | 12/2011 | Khare et al. ................. 715/751 |
| 2011/0313954 A1* | 12/2011 | Zhao et al. ...................... 706/12 |
| 2012/0036015 A1* | 2/2012 | Sheikh ....................... 705/14.54 |
| 2012/0296919 A1* | 11/2012 | Sinha et al. ................... 707/749 |
| 2013/0086072 A1* | 4/2013 | Peng et al. .................... 707/743 |

OTHER PUBLICATIONS

Uniform resource locator ("URL") www.google.com.
The international preliminary report on patentability dated Feb. 25, 2014.
The international search report dated Feb. 26, 2013.
Written opinion of the international searching authority dated Feb. 26, 2013.

* cited by examiner

My Wall

| My Wall | Search | acmeadmin

What's going on?

Attach: 📎 File 🔗 Link                    Post

Dan Boyle Any recent posts? Sent at 11:45 EST 8/11/11
posted to : ▶ 💬 dan.boyle
2011-08-11 08:45 am Reply Like
💬 2 comments

Dan Boyle Anybody here?
posted to : ▶ 💬 dan.boyle
2011-08-11 12:56 pm Reply Like
💬 3 comments

Dan Boyle Team acme, thanks for your support for this experiment. Would you be able to send me info on how many people (and who) participated? I'm not able to see this under the Admin tab.
posted to : ▶ 💬 acme
2011-08-10 09:04 am Reply Like
👥 Andy Boone likes this
💬 2 comments

Sally Van The "linked in" link doesn't appear to work? I am getting a java error message and don't get prompted to login. @heinz do we plan to allow this "linking" with external sites?
posted to : ▶ 💬 acme.help
2011-08-10 08:34 am Reply Like
💬 6 comments

Joan Wilder Where would I see the invitation to the webcast?
posted to : ▶ 💬 acmeadmin
2011-08-10 08:02 am Reply Like
💬 1 comments Subjects — 601

602 {

| My Subjects | Search |

Name | | Action

ABC — This subject is for conversation and collaboration around ABC products. | ⚙ ▶

ABC.ChilliSauce — This subject pertains to the Chilli Sauce products of ABC | ⚙ ▶

ABC.MilkShake — This subject pertains to ABC Milk Shake division. | ⚙ ▶

BagelBites — This subject is for communication and collaboration around the Bagel Bites business unit. | ⚙ ▶

BagelBites.Nutri.... — This subject is related to Bagel Bites nutritional information. | ⚙ ▶

People

603 {

| My Following | My Followers | Search |

Name | | Action

Amy Oldi.... | ⚙ ▶

Alice Farley | ⚙ ▶

|  | PEOPLE | POSTS | EXPIRES IN |  |
|---|---|---|---|---|
|  | 14 | 207 | 18 Days | Search |

🏠 Home  ✏️Subjects  👥 People  🖼 My Profile  📡 Event Streams                    Sign out Help Center —2405
2402 — Watch our Tutorial Videos or read the Questions and Answers section.
 ＼Feature Videos   2401

Getting started with acme      acme on iPad       acme on iPhone

[▶]  [▶]  [▶]   »

Questions & Answers  2403      Frequent Asked Questions:   2404      Expand All
Evaluation                How do I post a message to my acme wall?
[Posts]                   How do I post a message to a subject?
Subjects                  How do I post to multiple subjects or people?
RSS                       What happens if I address a post to both public and
Filters and Event Streams  private subjects?
Email Notifications       How do I post a private message?
Chat                      How do I delete a post?
Mobile                    How do I view a post from a specific colleague?
Technical                 How do I share a post with other people and subjects?
                          How can I find a post that I made a few days ago? The new
                          posts have pushed it down.
                          Is there a limit to the number of characters in a post?
                          Is there a size limit on file attachments to acme posts?
                          Can I post to a group of people?
                          Can I reply to a post from my email without logging in to acme?
                          What happens when I mute a post?
                          How do I announce a post?

Can't find the answer?  [Contact Support]  2406

*FIG. 24*

COLLABORATIVE, CONTEXTUAL ENTERPRISE NETWORKING SYSTEMS AND METHODS

CROSS-REFERENCE TO RELATED APPLICATION

This application claims priority to U.S. Provisional Patent Application No. 61/526,818 entitled "COLLABORATIVE, CONTEXTUAL ENTERPRISE SOCIAL FUNCTIONALITY," filed on Aug. 24, 2011, and U.S. Provisional Patent Application No. 61/565,284 entitled "COLLABORATIVE, CONTEXTUAL ENTERPRISE SOCIAL FUNCTIONALITY," filed on Nov. 30, 2011, both of which are incorporated herein by reference in their entirety.

BACKGROUND

It is advantageous for business employees to stay in contact among themselves and with outside resources, such as vendors, clients, partners, customers, fellow industry workers, etc. The use of media can be helpful in allowing people to stay connected and collaborate on projects. Current media implementations, however, can detract from business goals and waste time, as well as cause issues with confidentiality and privacy.

SUMMARY

Disclosed herein is an enterprise network allowing businesses to connect employees with one another, as well as with the businesses' outside resources. This enterprise network includes "subjects," which provide a quick and easy way to discover and categorize information and allows users to quickly find the information they are looking for. There are various dimensions to the subject that provide for ways to categorize information associated with it—these dimensions can be associated either manually by the user or automatically generated—these dimensions include
  a. Ad-hoc (Opt-in or explicitly added) groups of people
  b. Organization structure or project teams
  c. Geographic location of their workplace or workers' current locations
  d. Specific data sources or applications from where information is being pulled from (e.g., CRM, ERP, Purchase Order type applications)
  e. Public, private, or invitation-only subjects For example, if a user wants to share confidential information with just company executives and not with the rest of the company, in embodiments disclosed herein the user may easily share that information with all of the executives by sending the information to an "executives" group, instead of having to send multiple emails and wait for multiple replies. The information reaches the right people, and all of the recipients can comment openly with one another on the enterprise network, without other users seeing their messages.

This enterprise network allows for this connection between internal and external to be made in a work-productive way by adapting the applications to the user and their needs, as well as creating incentives to improve work, all while maintaining company privacy.

The enterprise network communities provide a one-stop approach to create, manage, interact with, and monitor customers, partners, resellers, and vendors from one interface. Thus, through the disclosed embodiments as global enterprises look for more ways to create two-way dialogs with their stakeholders, they will have created internal communities behind the firewall, as well as external communities addressing partners, customers, and others. The disclosed enterprise network communities provide a single integrated approach to diminish the "enterprise sprawl" that would otherwise result from having multiple forms of creating secure communications channels.

The disclosed enterprise network communities partition separate groups. These partitions allow for privacy by separating certain groups of users. In described embodiments, users will not be able to join or see any information that has been posted or exchanged between members of a community if they are not members of that community. This partitioning of groups into communities allows users to privately and securely send, share, and receive information within a defined community. For example, if a user wants to communicate confidential information to a supplier, an external resource, the user may do so without worrying about other groups he or she interacts with knowing. The user may also contact one of the sellers with comments and for dialog, instead of contacting all of the company's sellers.

Other features of the enterprise network that allow for ease of communication and the sharing of ideas within communities and among subjects include profiles, microblogging, instant messaging, video conferencing, screen sharing, voice memos, event streaming, integration of external programs, life stream, and mobile availability. Profiles allow users to search for colleagues. Searching for colleagues offers users the chance to connect with colleagues they do not know directly. By getting in touch with colleagues outside of the user's general contacts, the user may be able to receive helpful feedback or advice from someone in a particular department. Microblogging allows users to post general questions or comments to various forums, such as the user's wall, someone else's wall, a subject, or a community. With this feature, the user may open a contextual dialogue on a particular topic of interest with other users in the company's enterprise network. Instant messaging allows users of the enterprise network to view who is currently online and open a direct line of communication with another user. This direct line of communication may result in rapid responses that help everyone complete their work more efficiently.

Video conferencing allows the user to easily create face-to-face interaction between members of specific subjects. The enterprise network automatically can generate calendar invites and email notifications for all participants for conferences based on the users associated with the subject. While in a video conference, users may record the video conference and post the media on the wall of the specified group that was invited to video conference. The ability to post the recording to the selected group's wall may be very beneficial, especially to members of the group who were unable to attend. Users also have the option to create transcripts of the video conference, which may be posted on the appropriate group's wall as well. While in a video conference, users may share their screens with the other users in the video conference and show these other users what they are working on or what they are referencing. Voice memos allow users to post voice messages to specific communities or subjects from their phones. For example, in the case that a user is driving or unable to send a typed message for another reason, but needs to send a message to his or her team, rather then calling each individual member separately, the user may call and leave a message on the enterprise network to a group with all of the team members. With voice memos, users can save time in situations like this, as well as ensure that every member of the user's team receives the message that needs to be relayed.

Event streams allow users of the enterprise network system to access business systems from within the enterprise network. For example, users may approve expense reports for employees without ever leaving the enterprise network. Integration of outside programs, such as SharePoint, allows users to search and work in the programs without having to leave the enterprise network. Users may also upload files from outside business systems to their subject's or community's wall. Other media like Facebook, LinkedIn, and Twitter may also be connected to a user's enterprise network. By connecting users to outside media, the user may always be connected, even while staying on the enterprise network. Another way users may stay connected at all times is through mobile applications that run on devices while the user is away from his or her computer. These features of the enterprise network may allow users to stay connected and work in various applications without leaving the enterprise network.

The above collaborative elements of this network are provided in a unique contextual way, such that conversations can be built around subject and communities, and followers of subjects and members of communities can automatically and efficiently be brought into relevant, business-productive conversations and discussions.

Another feature of the present application provides for networking gaming techniques in order to induce loyalty and to help modify consumer behavior. The enterprise network may optimize these techniques for the enterprise setting, thereby creating a platform for tracking employee behavior within the enterprise network as well as guiding employees to modify their behavior in a desired manner.

A typical software application allows users to evaluate a product on a trial basis for a predetermined period of time (e.g., 15, 30, 60, or 90 days). While this evaluation period allows users to test the product for their specific needs, having a predetermined evaluation period may not properly encourage users to test all of the program's features. In addition, having a predetermined evaluation period may not encourage users to fully evaluate the program, thereby resulting in the application losing out on valuable evaluation feedback from end users. What is desired are a system and method to motivate and incentivize widespread adoption and evaluation of the program.

To motivate widespread adoption and evaluation, the enterprise network introduces time-bound awards that allow continued evaluation of the application and/or additional add-on modules in exchange for invitation acceptance and user participation. Gaming techniques such as multidimensional leveling, leader boards, badges, status, recognition, appointment dynamics, guided outcome, intrinsic motivators, and extrinsic rewards may be used to encourage continued evaluation of the application. By encouraging and incentivizing users to evaluate the product and invite new users to evaluate the product in exchange for an increase in time that users are allowed to continue using the product and/or providing additional add-on modules, the application may receive greater evaluation feedback that it otherwise may not have received if the application had a predetermined evaluation period. In addition to receiving increased feedback, the application may also receive higher quality feedback, as the application may target specific users for feedback based on their positions within the organization, number of invitees, number of followers, etc.

The enterprise network may also use tracking to map users' activity within the application in order to present each user with a tailored user interface. The application may map where each user clicks, who the user interacts with, what he or she comments on, and subjects the user finds interesting. The application may present a tailored user interface based on the organization, user's clicking history, level of awards, job descriptions, size of network, and even where the application wants each user to focus his or her future evaluations. For example, if a user is identified as a marketing employee of the organization, either through self-identification or identification by the application, the application may look broadly at how the collective group of marketing employees is utilizing the network and present the interface differently for marketing employees than for engineering employees. Marketing employees may be more inclined to browse through networking posts on colleagues' walls, while engineering employees may be more inclined to search for an answer to a specific inquiry using a search bar. As a result, the user interface for marketing employees may be more focused on wall posts, specific groups, subjects, and colleagues that marketing employees may be interested in. tracking may incentivize specific users to perform certain types of evaluations for specific types of behavior in order to return the highest quality and quantity of evaluations to the application.

By using the information from the network with tracking, each user may become more intertwined within the enterprise network and as a result, may spend more time on it. By spending more time on the enterprise network, the user and/or organization may be able to extend their evaluation period to 30, 60, 90 days or more, for example, and therefore may become more inclined to purchase the full version of the application.

Certain features that have been disclosed in this document are further described more specifically in a published "How-To Guide" that is attached hereto as Appendix A[1] to the present specification. This Appendix A is fully a part of the present application by virtue of it being an appendix hereto, and it further incorporated by reference herein. Attached aspects of elements of the present application are additionally described in a features of the inventions disclosed in the present application are further illustrated. One of ordinary skill in the art would readily understand how features described in Appendix A could be employed in the systems disclosed in the present application in conjunction with the other features shown and described herein.

[1] Tibbr®, tibbr Service, tibbr Community, and tibbr Community Service, How-To Guide, Software Release, February 2012, at https://docs.tibco.com/pub/tibbr/3.5.-april-2012/doc/pdf/tib$_{13}$tibbr_howto.pdf, included herein as Appendix A, which is incorporated herein by reference for all purposes.

BRIEF DESCRIPTION OF DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components be omitted in certain figures for clarity of discussion. Reference is now made to the following descriptions taken in conjunction with the accompanying drawings, in which:

FIG. 1 is a screenshot of a user's homepage. The user's wall for a specific community is shown here.

FIG. 2 shows the system architecture and how external elements, such as other websites or different views, are processed through the main machine.

FIG. 6 shows the enterprise network options users can have integrated with external programs.

FIG. 10 shows how subjects can be based on not only business topics, but also locations that allow for collaboration over geolocation.

FIG. 18 shows a screenshot of the "What's Interesting" page when a user is setting up an account for the dynamic evaluation period.

FIG. 23 shows a status screen that may be presented to users upon logging in to the enterprise network.

FIG. 24 shows a help screen available to users.

Figure 2A:
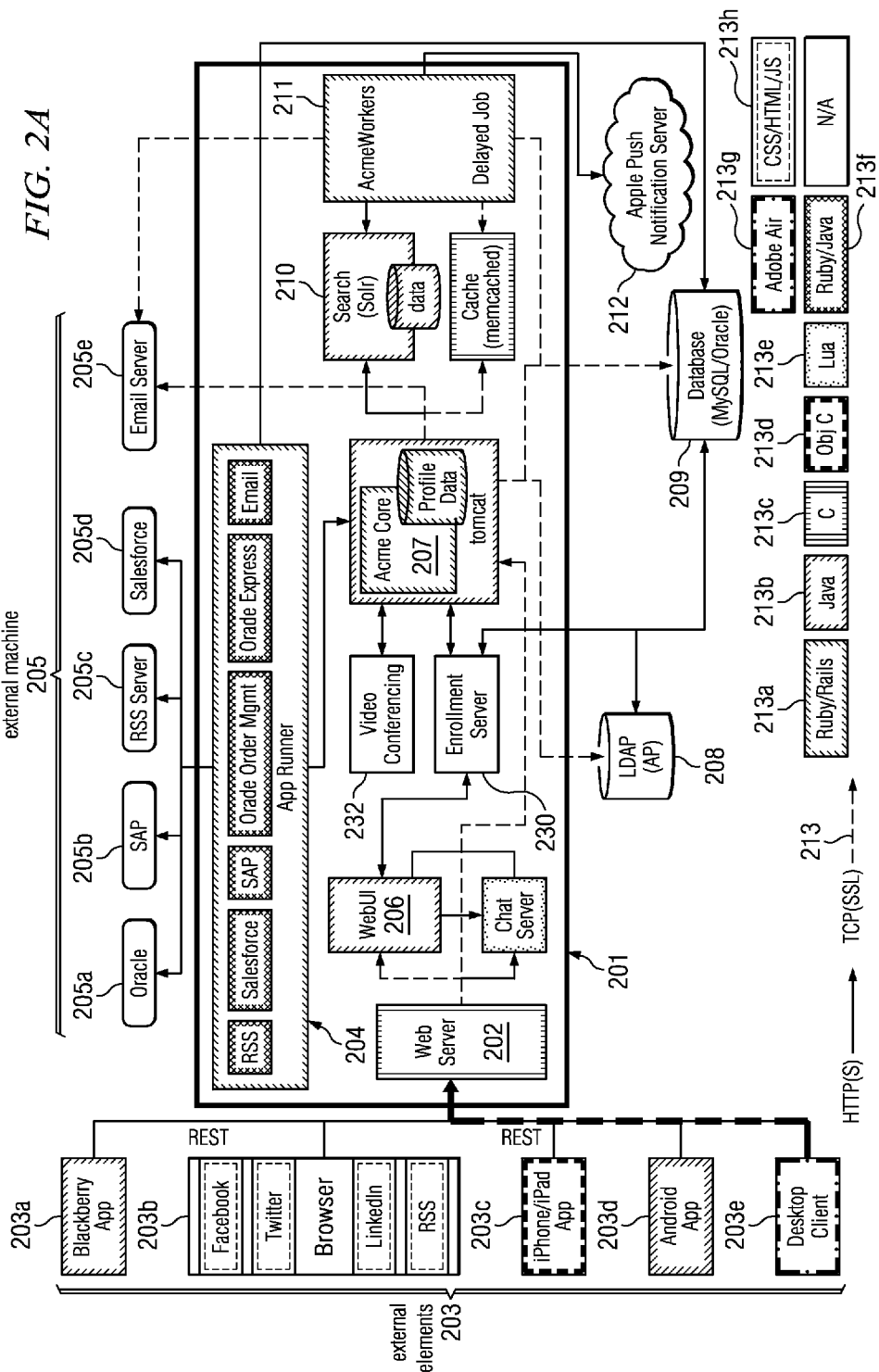
FIG. 2A offers a viewpoint from the inner workings of the system.

These exemplary figures and embodiments below provide a written, detailed description of the inventions set forth by any claims that issue from the present application. These exemplary figures and embodiments should not be used to limit any claims that ultimately issue in a patent from the present application.

DETAILED DESCRIPTION

Figure 1:
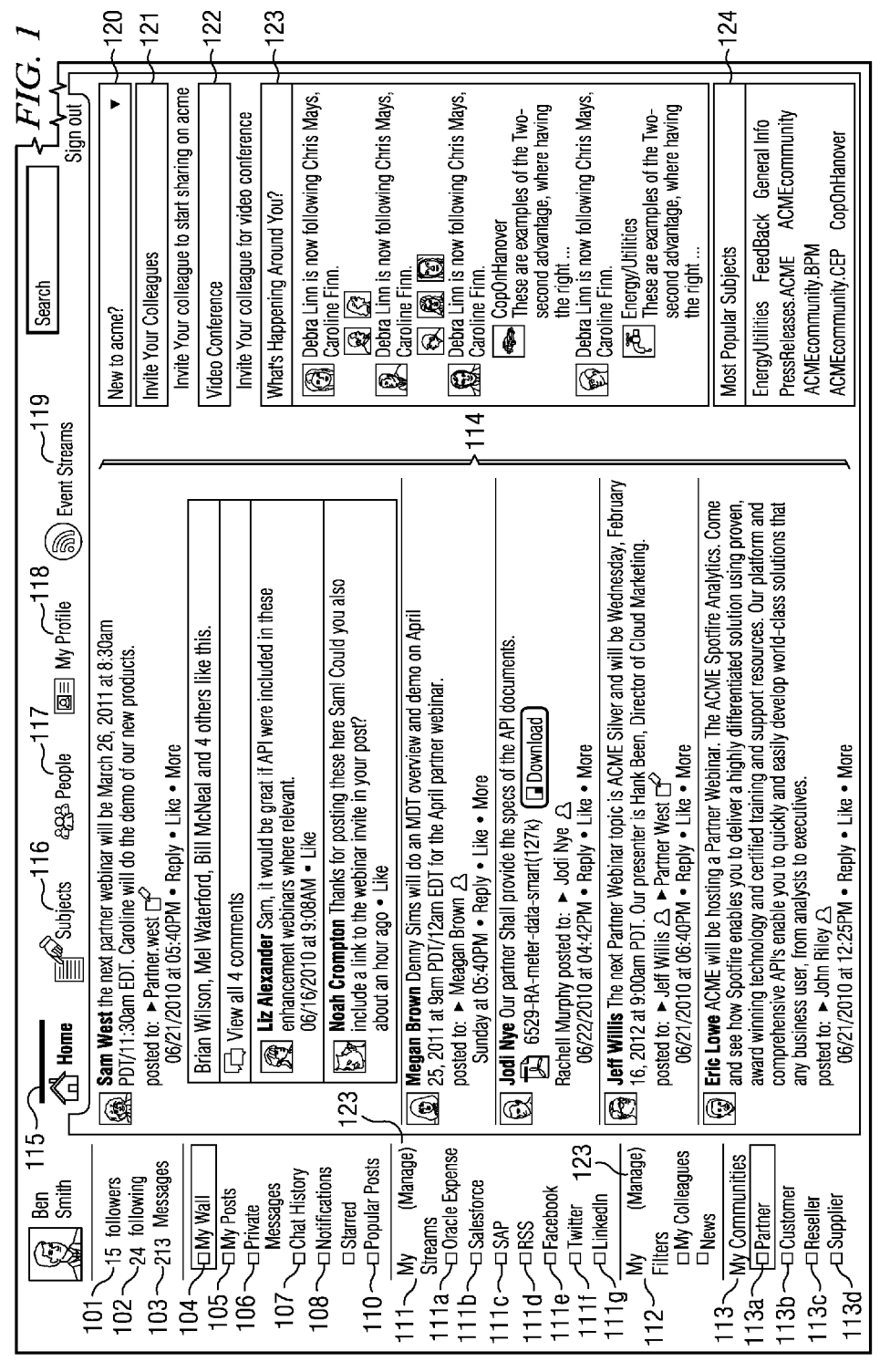

FIG. 1 shows what a user desktop may look like for a preferred embodiment of the present application. On the left side, the desktop shows for a particular user, proceeding from top to bottom, the user's followers 101, following 102, and number of messages 103. It provides options to go to the user's wall 104, posts 105, private messages 106, chat history 107, notifications 108, as well as generally popular posts 110. Further, it includes various event streams 111 the user might be following, which for example might include machine interfaces such as from Oracle Express, Salesforce, SAP, RSS, Facebook, Twitter, and LinkedIn. Various sources for such machine interfaces are described in further detail below in FIG. 2.

Still referring to FIG. 1, with event streams 111, users can configure and receive events into the enterprise network from enterprise applications that users run day to day. The event streams 111 may be configured as plug-ins that integrate with specific enterprise applications. As will be described below, the event stream 111 operates as a daemon process that runs the configured event streams 111 from each connected external machine, with exemplary event streams 111 as follows:

RSS—The enterprise network provides support for listening on RSS feeds and makes them available in a contextual way through the enterprise network subjects 116. Users may configure RSS feeds from various sites to publish messages 103 to the enterprise network subjects 116. The application may provide streamlining functionality such that the messages 103 are published only once on a stream window.

Email—The email event stream 111 may offer integration with email clients by delivering the enterprise network messages 103 to the subjects 116 and people 117 as addressed. That way, users can receive, post, or reply to messages from email clients such as Outlook, iPhone, or BlackBerry. In the enterprise network, users may send and receive email in a secure mode as facilitated by the email server.

Salesforce—In the present example, the system may receive a Salesforce event stream 111b by connecting to the Salesforce system and retrieving records according to user-specified preferences. Records may be published as private subjects 116 on the enterprise network. Of course, as with other exemplary event streams described here, Salesforce is an example of a current commercial CRM software/service. The implementation allows for any such integration with this or similar types of applications.

SAP—In the present example, the enterprise network receives an SAP event stream 111c, reading events from SAP and publishing them as messages 103 to a subject 116. Again, the reference to SAP as an enterprise system is exemplary. Other enterprise-oriented systems and/or databases can be coordinated and/or synchronized with subjects 116 or communities 113 to provide such followers or members with timely and relevant updates therefrom.

Oracle Expenses—The Oracle Expenses event stream 111a enables a user to browse the details of expense reports and, if the user is a manager, approve the expense reports of others.

Oracle Order Management—The Oracle Order Management event stream 111 may track the order fulfillment process and publish the status as messages 103 to a subject 116. Oracle Expense and Oracle Order Management are merely two examples of business process related stream updates that can be coordinated and/or synchronized with subjects 116 and communities 113

Voice Memo—The Voice Memo event stream 111 enables the posting of voice messages in the form of audio files to the enterprise network.

Also shown in FIG. 1 are the user's filters 112, which may be used to define certain subsets of information to be included in an event stream 111, with filtering in this example by colleagues or by news. The event streams 111 and filters 112 can be configured by the user through the "manage" icon 125. Finally, on the left is "my communities," 113 which in this instance defines partner 113*a*, customer 113*b*, reseller 113*c*, and supplier 113*d* segments; these may be used to limit the information accessed to or from a particular user depending on whether certain machine interactions or human interactions are within each of these community segments.

Still referring to FIG. 1, in the middle portion of the screen is a newsfeed 114. In this particular instance the partner community 113*a* is selected, so the newsfeed 114 reflected on the screen would be that which relates to the partner community 113*a*. The general view indicated here is the home view 115, which provides a generalized newsfeed 114. As indicated by the various boxes at the top of the screen—subjects 116, people 117, my profile 118, and event streams 119—it is possible to present different views to the user in order to allow the user to receive news 115, follow subjects 116, follow people 117, configure his or her personal profile 118, or follow event streams 119.

To the right side of FIG. 1, there is an informational help option for users who are new to the enterprise network 120, one that allows a user to invite other colleagues 121 and to initiate a video conference 122. Further provided is a "what's happening around you" window 123, which includes news updates, as well as status updates by other users and colleagues who are relationally close to the user. Finally, there is a "most popular subjects" 124 box that shows currently active subjects in the reflected community. Consistent with the functionality reflected in FIG. 1, the system architecture diagram is illustrated in FIG. 2A. At the center of the system architecture 201 is a network processor or network processing machine 207 that is operable to provide overall control, coordination and processing for the network system described in embodiments herein. Provided within the system 201 and in communication with the network processor 207 is a web server or web client interface 202 that provides an interface for external elements or client machines 203 such as a BlackBerry 203*a*, various browsers (e.g., Facebook, Twitter, LinkedIn, and/or RSS) running on client devices 203*b*, iPhone/iPad 203*c*, Android 203*d*, and an associated desktop client application 203*e*.

Also provided is an app runner interface or enterprise application interface 204 that connects to various external machines 205 such as Oracle 205*a*, SAP 205*b*, RSS Server 205*c*, and Salesforce 205*d*. This interface comprises the machine interface previously described with respect to the screen interface that allows the user to see updates fed from such machine applications associated with their communities 113, followed subjects 116, or other pertinent groupings. The app runner 204 accordingly provides an interface for the network processor 207 to receive and coordinate those feeds and make them available to users through the web server 202 (running the webUI interface 206) to the users' client machines 203.

With respect to the overall coordination of the network system operation, the network processor 207 is a computer processor operable to execute computer code on a computer-readable medium that would be attached to or embodied within the network processor 207. This network processor 207 accordingly provides the logic for associating various subjects 116 and people 117, including by interfacing with the LDAP server 208 to verify user logins and credential and the database 209 (e.g., MySQL/Oracle) which would provide profile data that the network processor would use to form the appropriate contextual relationships and provide appropriate feeds accordingly. The network processor 207 may be operable to directly provide user streams according to interests in the database 209, or a separate stream server (see FIG. 2B) in communication with the network processor 207 may be provided to specifically provide such user streams. The network processor 207 may further provide for search capability through the Solr search 210. Finally, also provided is a worker's interface 211 that provides "push" notifications, such as through a notification server 212, such as an Apple Push Notification Server 212.

FIG. 2A also indicates the types of connections made between the system elements and software operating on the various sub-machines 213, such as Ruby/Rails 213*a*, Java 213*b*, C 213*c*, Obj C 213*d*, Lua 213*e*, Ruby/Java 213*f*, Adobe Air 213*g*, CSS/HMU/JS 213*h*. All of these system and software elements are operated through computer instructions stored on computer-readable media associated with processors associated with the system 201.

Further provided in FIG. 2A is an enrollment server 230 in communication with the web server 206 to receive new user enrollments and to communicate with a database within the system 201, such as a database connected to the LDAP server 208 and/or with the database 209 to build user profiles into the system. Central coordination and control of the various servers and databases in the system 201 is provided by the network processor 207.

Figure 2B:
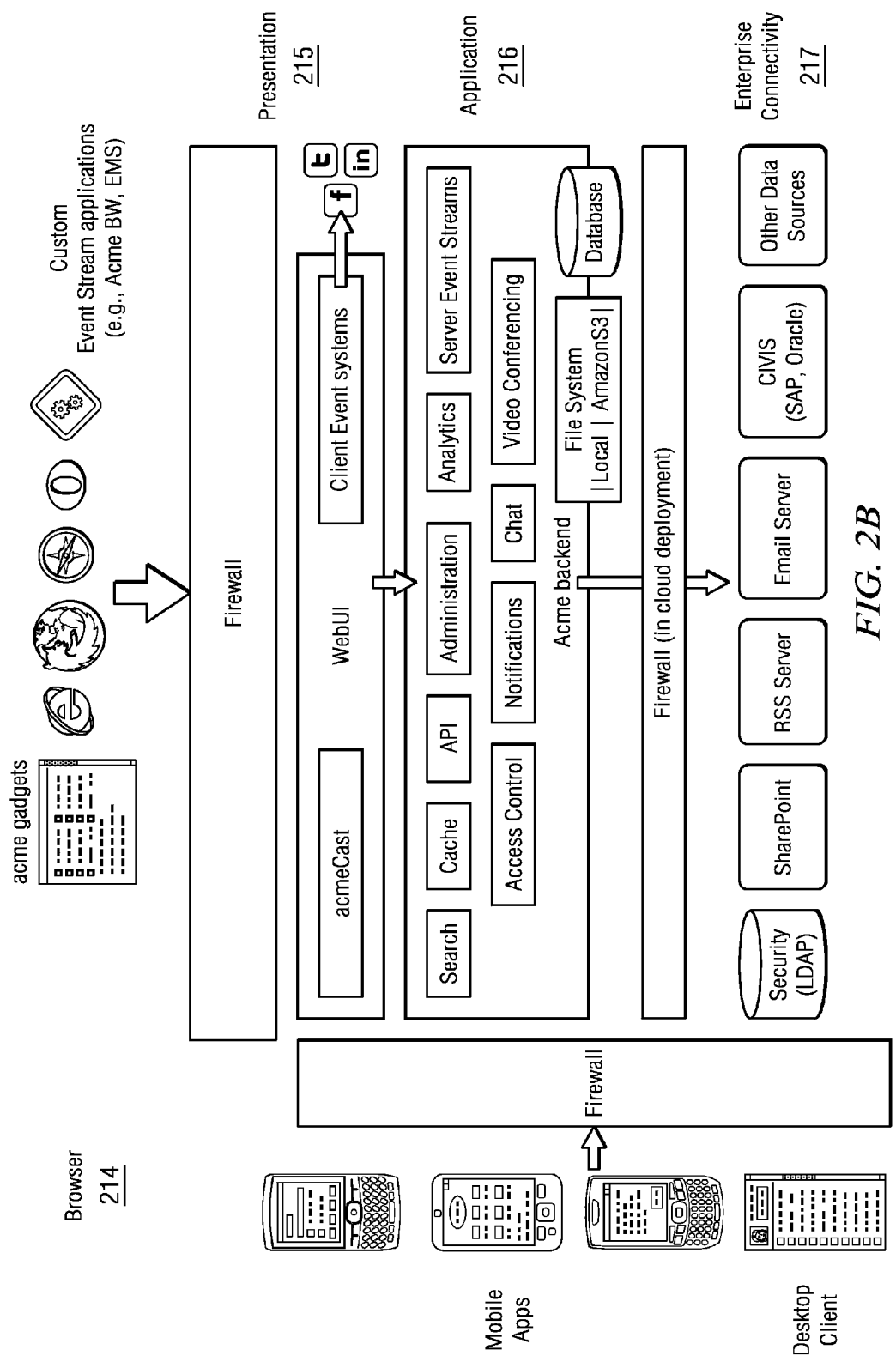
FIG. 2B shows the system architecture with emphasis on the transaction layers.

FIG. 2B provides another way of viewing the above-described architecture of FIG. 2A, more from a level of the various transaction layers—browser 214, presentation 215, application 216, enterprise connectivity 217. The elements shown in FIG. 2B were described previously in the context of FIG. 2A, and FIG. 2B merely provides a different view of the dataflow and elements described in FIG. 2A. The logical and physical connections are consistent as between these two figures and would be understood by one of ordinary skill in the art. The above-described architecture and framework provide users the abilities to start new conversations with other users within appropriate contexts.

In particular as described herein, conversations and updates can be organized around subjects 116, as reflected in the subject 116 organization illustrated in FIG. 1. If this were a video conference 122, for example, there would be a group of colleagues associated with a certain subject 116. Within that subject 116, a user can initiate a new video conference 122, which might look like FIG. 3, and the implementation of this new contextualized, collaborative video conference 122 initiated around an enterprise-defined subject 116 is further described below.

Figure 3:
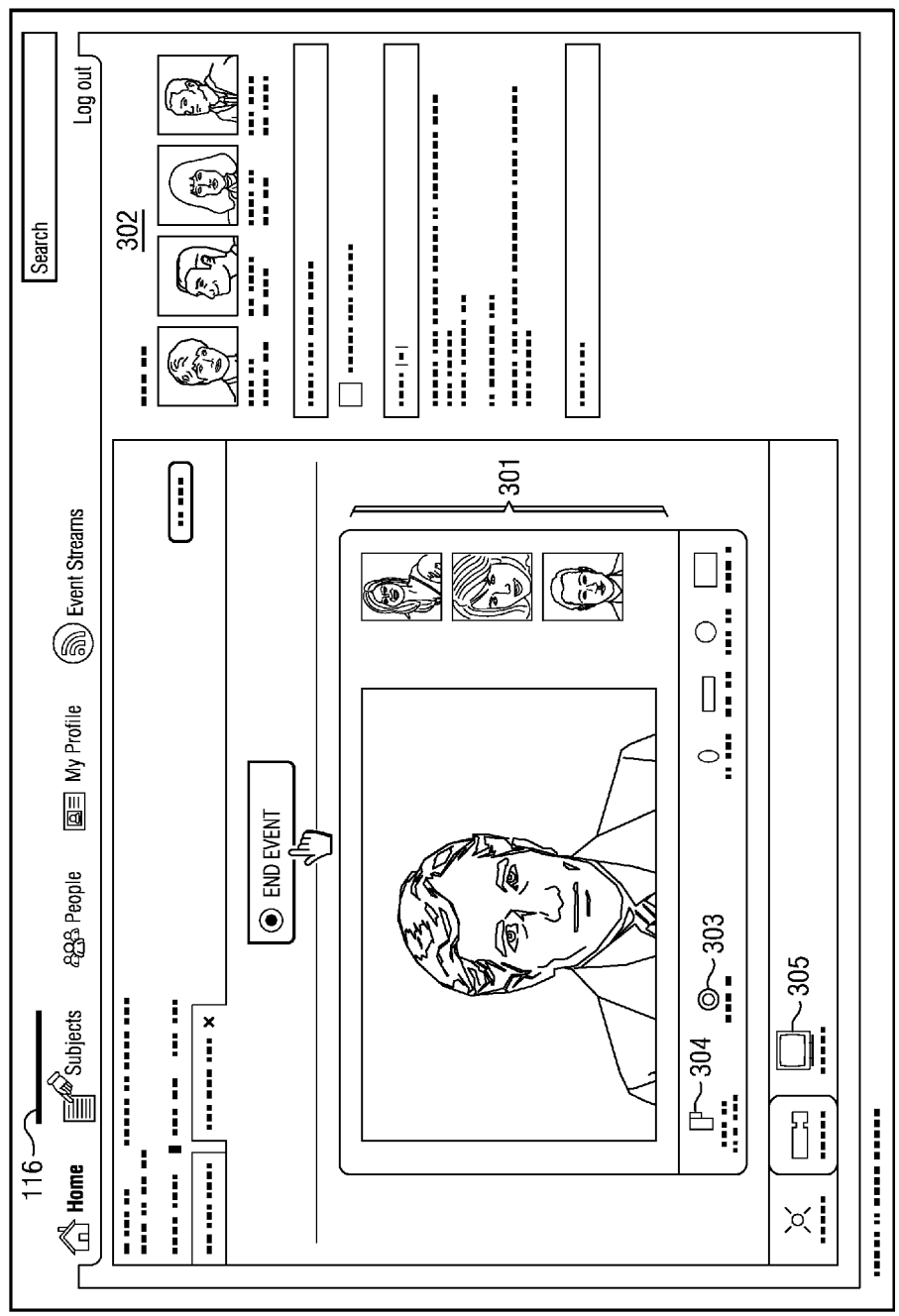
FIG. 3 shows a video conference with multiple participants and the functions available for video conference users.

In FIG. 3, the user may have entered this subject-focused video conference from a subject 116 screen mentioned in the FIG. 1 desktop by clicking on the video conference 122 button. The colleagues associated with the selected subject 116 would accordingly be pulled up and/or invited to participate, and this could be effected contextually, without any particular action by the user to invite the other interested colleagues. As shown in FIG. 3, a multiple thumbnail video interface 301 is presented, and the focus of the larger window may be adaptively switched 304 according to which of the colleagues is speaking at a given time.

These users may have been from among the following group 302 indicated for this subject 116 in the upper right hand corner of the screen. Particularly when following a certain subject 116, events occurring (notices received) within that subject 116 can be used to spur the subject-based, multiple-party video conferences 122.

The advantages of this approach are that it allows users to:
Be spontaneous: Have impromptu white boarding sessions with simultaneous screen sharing 305.
Broadcast: Perform company-wide video broadcasts of key events and announcements.
Save time: Automatically record 303 and store on relevant subject 116 walls for future playback and knowledge sharing.
Get face time: Catch up with a colleague and get some face time—whenever and wherever.

Accordingly, this video conference feature 122 is operable to combine video image sharing, desktop sharing 305, and archiving into one seamless package, and it delivers this feature into the relevant context—right onto the user's wall 104. With video conferencing 122, the user can address issues as they arise, in a direct and personal way. For example, if a user sees a post that requires instant clarification or face-to-face collaboration, he or she can simply start a video conferencing 122 session and tune in the relevant people 117 to a live discussion. Video conferencing 122 allows switching to desktop sharing 305, as well as automatic recording 303 and storing of the session to be posted afterward, fully searchable for those unable to attend.

Furthermore, a recording 303 can be stored and contextualized, including with automatic voice transcription that maps the recording to the appropriate subjects 116 within the collaborative, contextualized system and thus facilitates further searching and browsing.

Another feature of the described video conferencing 122 system is that it automatically employs security with respect to the communications that occur. When a video conference 122 is initiated within a discussion for a particular subject 116, only those users who are permitted to be associated with the subject 116 have access to be invited to a related video conference 122.

Figure 4:
FIG. 4 shows the enterprise network's smart widgets "floating" over an open window. The smart widget allows a user to provide feedback from his or her wall, without having to toggle between the feed on the wall and the window in which he or she is working.

With respect to FIG. 4, smart widgets are provided as a connection to the contextual system described in the present application to allow for integration of the contextual features described with others of the user's enterprise applications, such as SAP, Oracle, Salesforce, or the like. This way, contextual interaction may be provided in an enterprise network window that can "float" above or next to the application software window such that a user may receive contextual feedback in connection with the subjects that are presented on the enterprise application window. Smart widgets allow users of the enterprise network to work in programs unrelated to the enterprise network while remaining connected to the enterprise network. Users may remain connected to the enterprise network by having relevant feeds from their wall or from specific subjects updated and visible to the user as the user works in other programs. The ability to view the relevant feeds lets the user receive feedback from other users as it pertains to what he or she is working on.

For example, with further reference to FIG. 4, if "Business Optimization" were a relevant subject open within an enterprise software application, the "Business Optimization" subject of the enterprise network contextual widget could be presented to the user on the right side of the screen and overlying the enterprise software window. Thus, a back-end synchronization of subjects between the enterprise application database and the enterprise network contextual application may exist in order to provide these contextual widget overlays. By activating this feature, users are able to continue working within the context of their enterprise applications while having contextual, collaborative messaging resources and other contextual features available to further facilitate their work.

Figure 5:
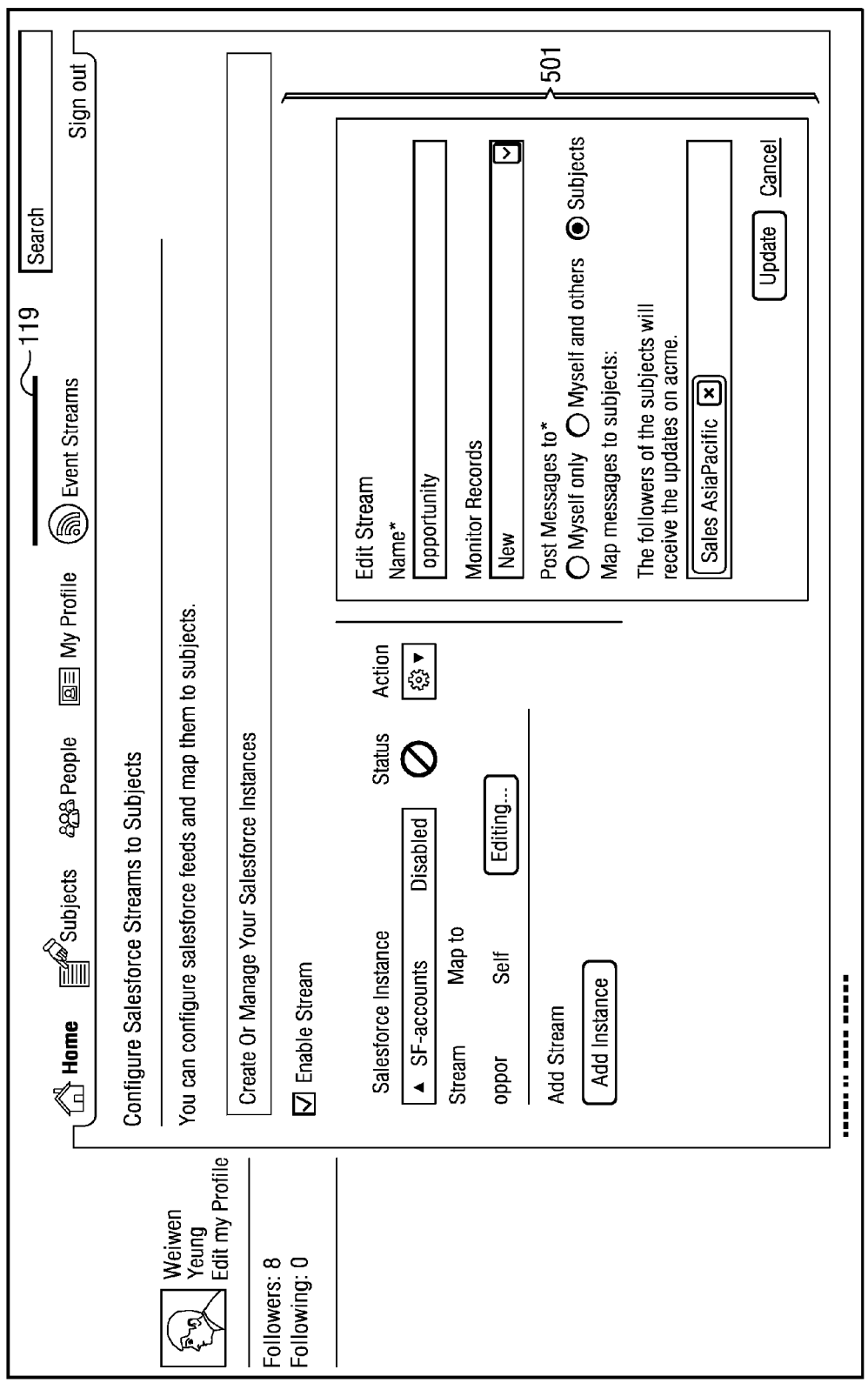
FIG. 5 shows the mapping of Salesforce feeds to the enterprise network's subjects, through the edit stream box shown in the webpage.

"Mapping" of enterprise application subjects to a user's wall 104 or subjects 116 is an approach for making the connections between those applications and subjects 116. This type of mapping is further described below in the example of a mapping of Salesforce event streams 111*b* to subjects 116 in FIG. 5. Specifically, The web interface in FIG. 5 shows the exemplary mapping of Salesforce streams 111*b* to subjects 116 through an "edit stream" box 501.

Mapping of context to applications can be done by the enterprise network gadget configuration as well. Taking SharePoint integration as an example, a SharePoint user can bring SharePoint content into the enterprise network by adding the enterprise network gadgets, as illustrated in FIG. 6. The user may also bring the enterprise network content into SharePoint with the enterprise network widgets. FIG. 6 shows various enterprise network gadgets users may have on their screen when working on an integrated program such as SharePoint. The various subjects the user may use include the user's wall 601, relevant subjects 602, and relevant people 603 to the user and the integrated program he or she is working on while on the enterprise network.

Figure 7:
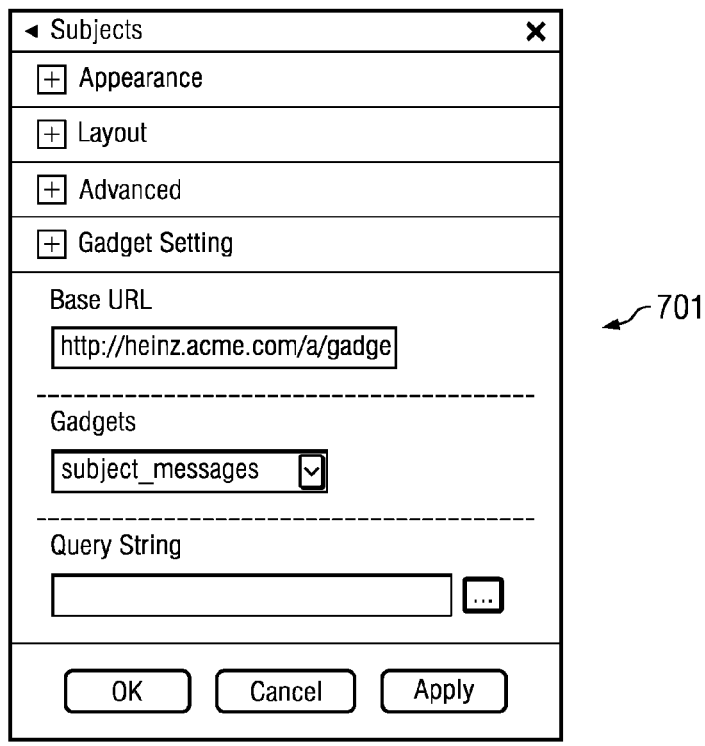
FIG. 7 shows the options for gadget configurations for integration of application content into the enterprise network.

FIG. 7 illustrates that the enterprise network gadgets can then be further configured to specify the enterprise network context that is most relevant to the application context by using the gadget configuration settings 701, such as by setting the "Base URL" that is used. The gadget configuration settings 701 also include ways to modify the "appearance," "layout," and "advanced settings," where, for example, "advanced settings" might include security settings or other more sophisticated setup elements. It is further possible to provide searching within the enterprise application as shown by the query string feature shown—in this way enterprise application subjects can be easily found and mapped to subjects in the presently described enterprise network. To abstract these configurations, for enterprise application content integrated into the enterprise network, the enterprise network maintains a mapping of enterprise application content and the enterprise network context, so the enterprise application content is associated with the most relevant enterprise network context.

For enterprise applications that integrate the enterprise network content into their context via the enterprise network gadgets, each enterprise network gadget is a self-configurable entity that maintains the mapping of application context and the enterprise network content. By using the enterprise network's gadgets, users may be able to integrate external programs into their enterprise network. Integrating external programs into one's enterprise network may let users stay within the enterprise network to work on documents from the integrated external programs or to utilize other functions of these programs.

Figure 8:
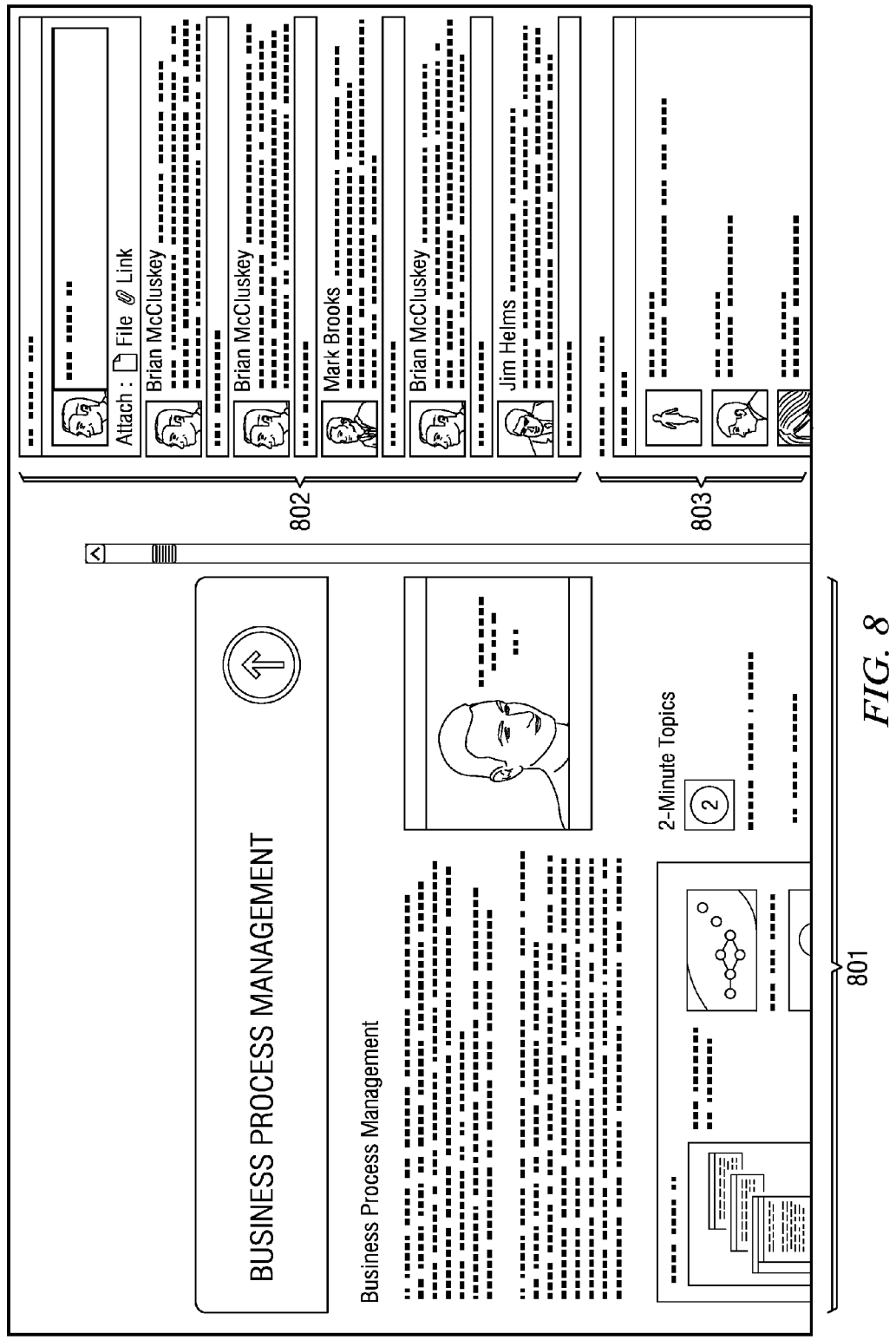
FIG. 8 shows the integration of a document management system and how it integrates functions into the enterprise network.

In addition to the contextual integration with the smart widget functionality, the present application provides for integration with enterprise storage and document management systems. In an example, the screen in FIG. 8 shows integration with the document management program SharePoint where the documents are organized under certain subjects and those subjects are in turn tied to contextual streams associated with the contextual functionality described in the present application. Through this approach, as a user navigates the enterprise documents 801, relevant messages 802 and 803 and the like are presented to the user through the enterprise network features shown on the right-hand side of FIG. 8.

In the present example, what is shown on the right-hand side are conversation threads 802 and users associated with the subject 803 "Business Process Management." Users may integrate external programs into the enterprise network, which allows them to access their files from the integrated programs while remaining within the enterprise network. Users also may be able to work on the external programs they have integrated into the enterprise network while in the enterprise network. By working on integrated programs within the enterprise network, users may receive feedback from those allowed access to such documents in their enterprise network. Users thus may be able to see comments from certain people 803 from particular groups or subjects 802 who help the user with his or her documents. By using subjects, users may also share their documents with relevant people without allowing other users who are not a part of the specified group to see. Through the contextual ties to the system and method described in the present application, users are able to find relevant context and initiate conversations/communications with other users or colleagues who are following the subjects encountered while navigating through the document management system. This generates efficient and effective teaming within that context.

The above-described document management integration, in the context of an exemplary integration with SharePoint (a program sold under a registered trademark not associated with the present assignee), allows at least the following functionalities:

Discovery: Search SharePoint subjects simultaneously with the enterprise network search to find the most relevant information and conversations.

Bi-directional activity: The enterprise network users may directly post back into SharePoint repositories.

Subject-level integration: Link documents in SharePoint to specific, granular subjects.

SharePoint widget: The enterprise network may also be embedded in SharePoint as a widget, going beyond mere event streams to ensure that SharePoint users get the full context of people, application, and system-level updates relevant to their profile.

Figure 9:
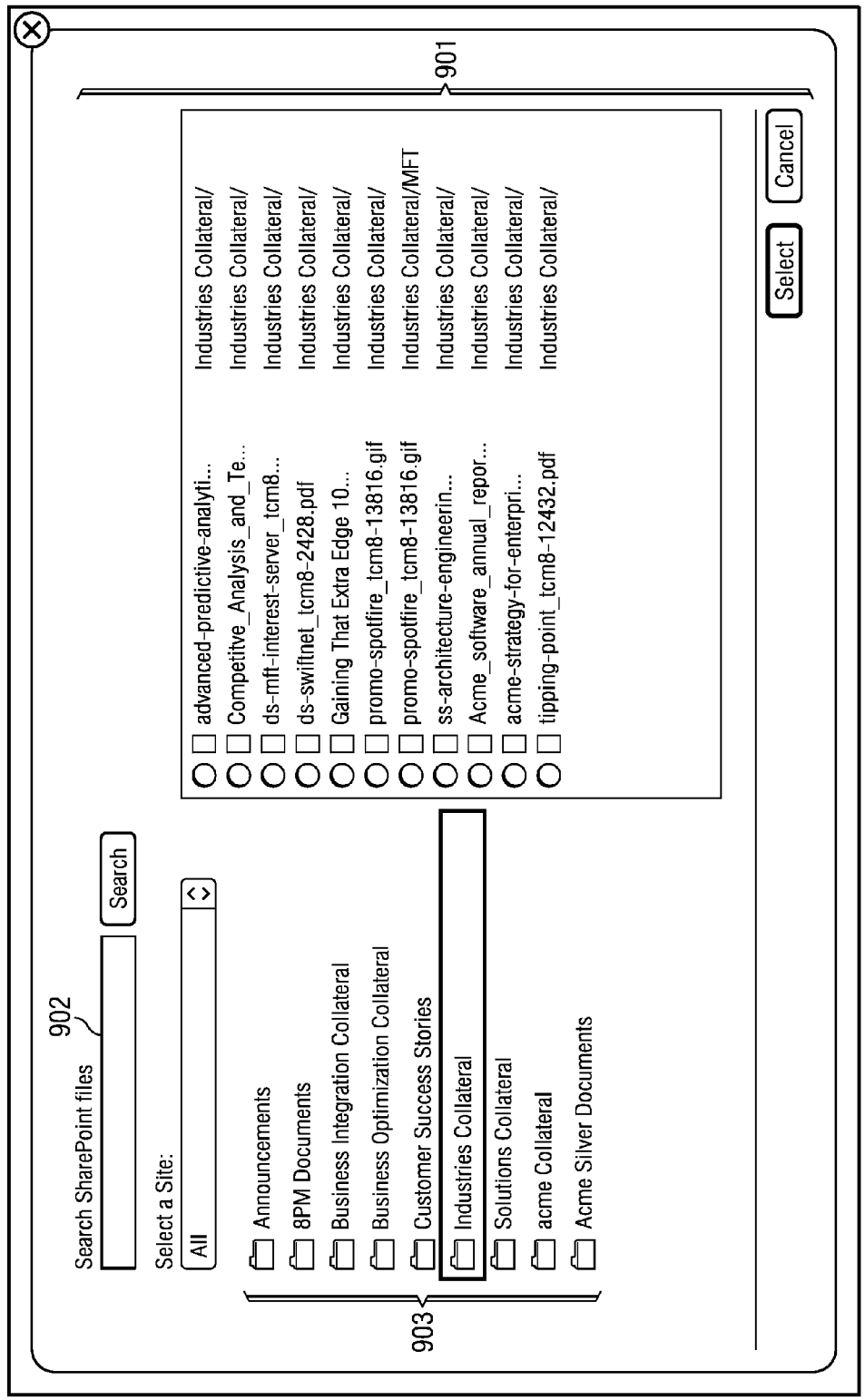
FIG. 9 shows the advanced searching capabilities of the enterprise network by combining document management searching with contextual collaborative content searching.

As to the "Discovery" element described above, FIG. 9 provides an exemplary simultaneous search screen 901. Notice how users may search SharePoint files 902 from within the enterprise network, providing for simultaneous searching of the contextual collaboration content as well as the document management system documents. Note that the sites/subjects 903 may be selected for more selective searching, still from the enterprise network.

Note that the above description of the advantageous features of the present embodiments in the context of their integration and coordination with a SharePoint enterprise document management system is exemplary of how such features could be implemented with other document management systems and or other enterprise-based software and/or database implementations. The generality of such interaction is comprehended within the description herein, and the scope of any claims issuing from the present filing should not be limited in any way to the specific embodiments described here.

Figure 10:
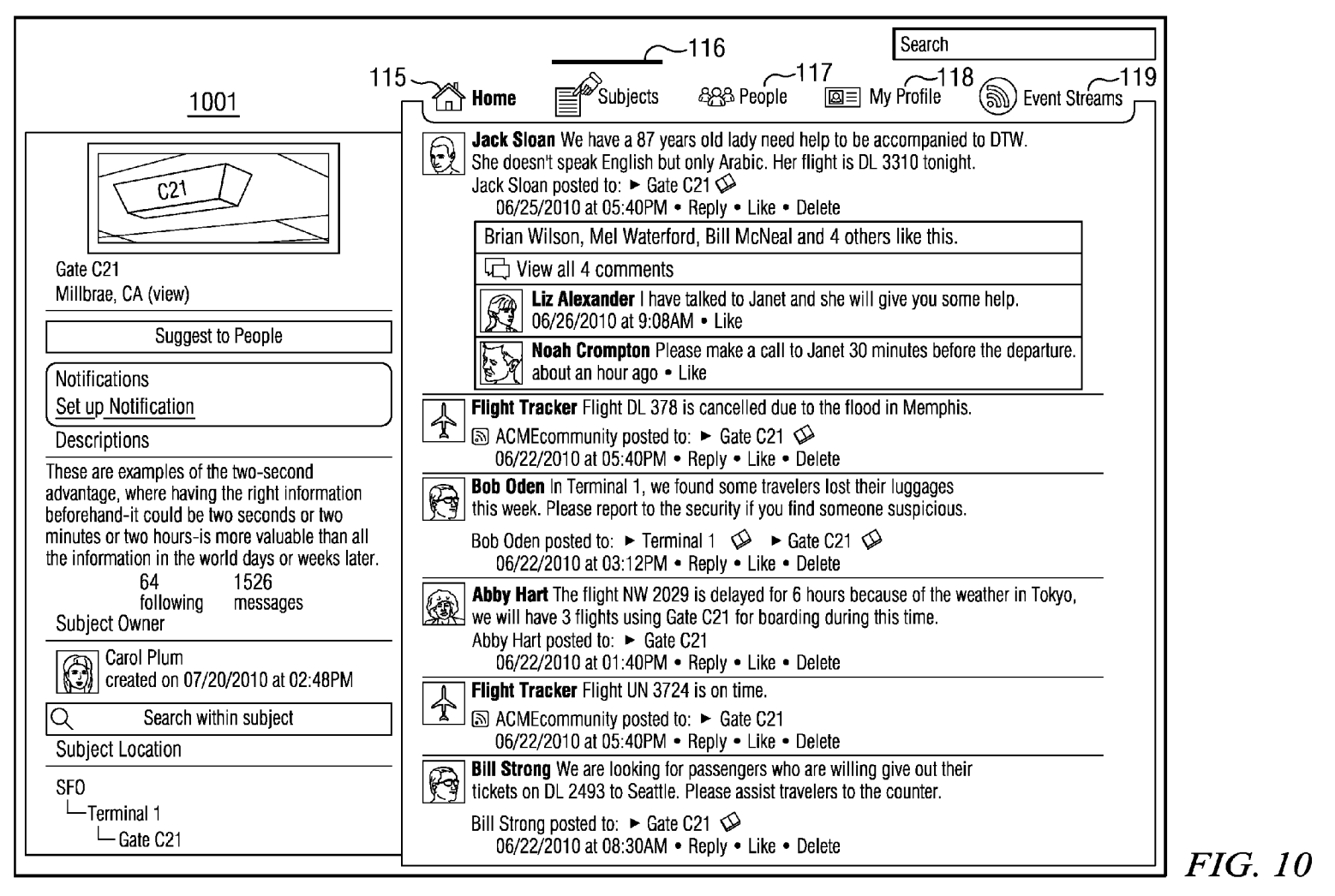

The subject-area-focused collaborative features enable unique applications in the context of geolocation as well. For example, rather than thinking of subjects 116 as more classic business subjects, a subject 116 could be a site or location. The below example in the context of an airport provides an interesting application of the above-described techniques. In particular, the screenshot 1001 in FIG. 10 is built around a terminal gate—"C21": Thus, the geolocation-based subject essentially operates as a hotspot around which relevant contextual information can be collaboratively stored and updated and around which relevant users can automatically interact with each other.

Figure 11:
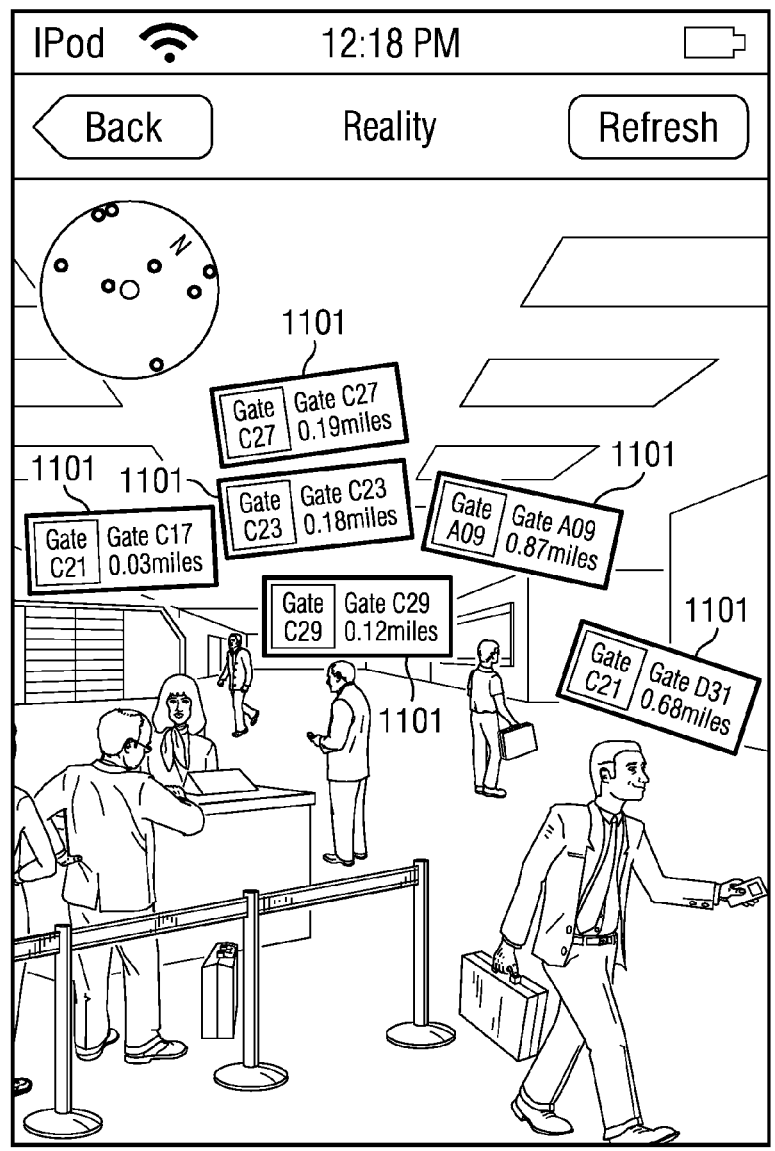
FIG. 11 shows an optional view for a smartphone of the subject/location gate C21 and how the creation of these subjects/locations can appear in relation to a user.

In addition to the features gained in the contexts described above, in that the system develops a contextual, collaborative framework for interaction with specified groups and around specified contexts, in the above described context there is a synergistic connection to geolocation. For example, a supervisor or other airport employee walking through a terminal with his or her personal communication device (e.g., smartphone) can quickly and intuitively focus on a subject 116 gate as illustrated in FIG. 11—note the superimposed gate icons 1101, which may be considered as references to relevant subjects 116 within this described system.

Figure 12:
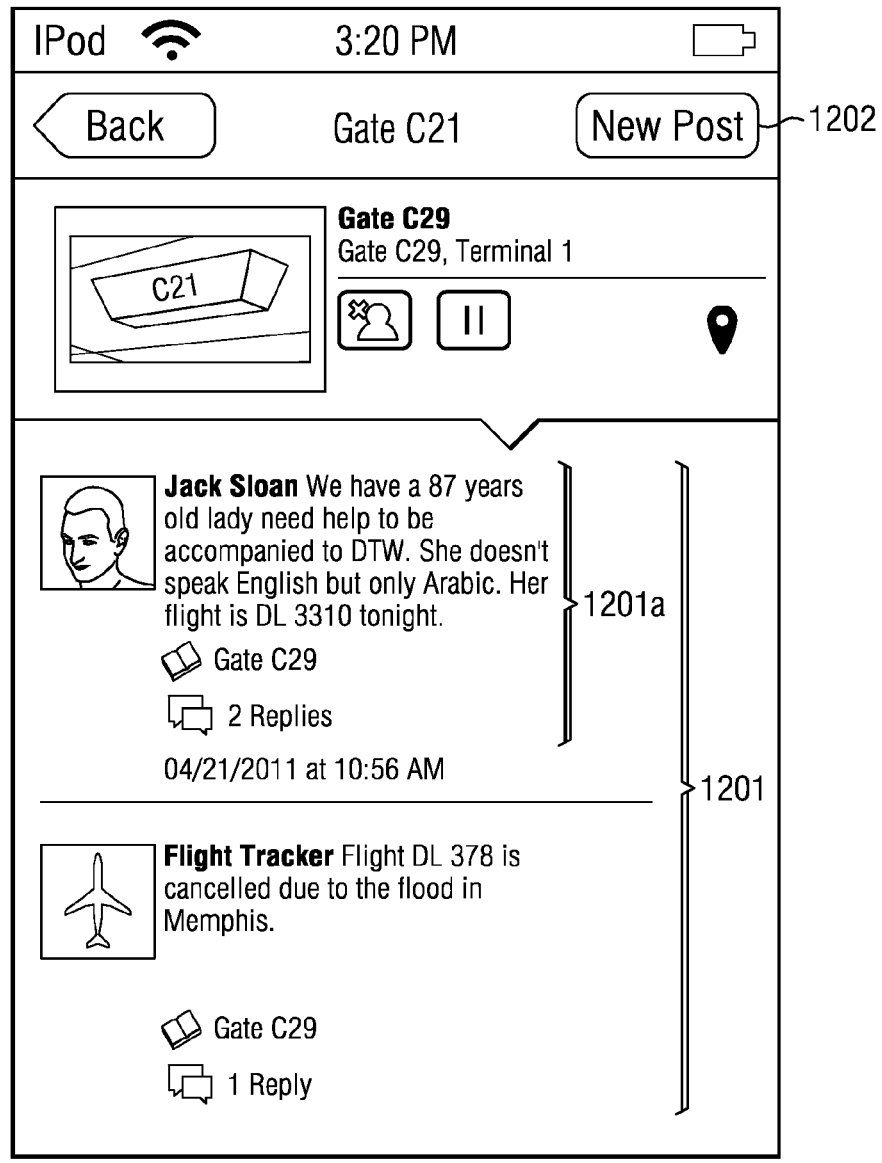
FIG. 12 illustrates another way to view information related to a location-based subject. In this screenshot, the view is based off of comments made relating to the subject/location gate C21.

Thus, a supervisor walking through the terminal with his or her personal communication device can be presented with discussions 1201 surrounding a particular gate by the users who are connected to that subject 1202, as in FIG. 12. Having discussions surrounding a location may allow users to stay updated on information pertaining to a particular location. As in FIG. 12, the post by "Jake" 1201a demonstrates the importance of being able to share information pertaining to particular locations in an efficient way that may reach everyone with one post.

Figure 13:
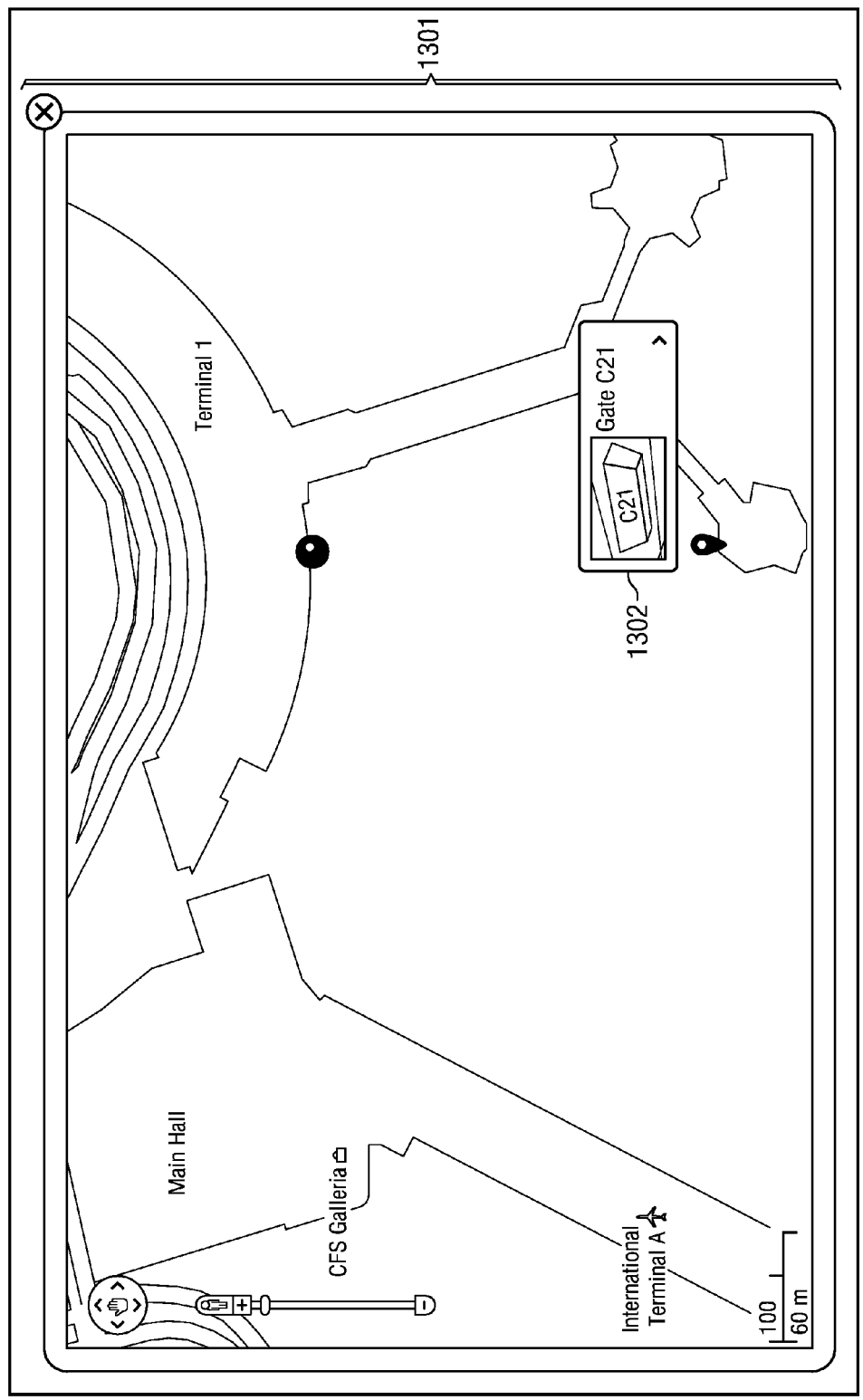
FIG. 13 is a two-dimensional top view map of location/subjects as icons.
Figure 14:
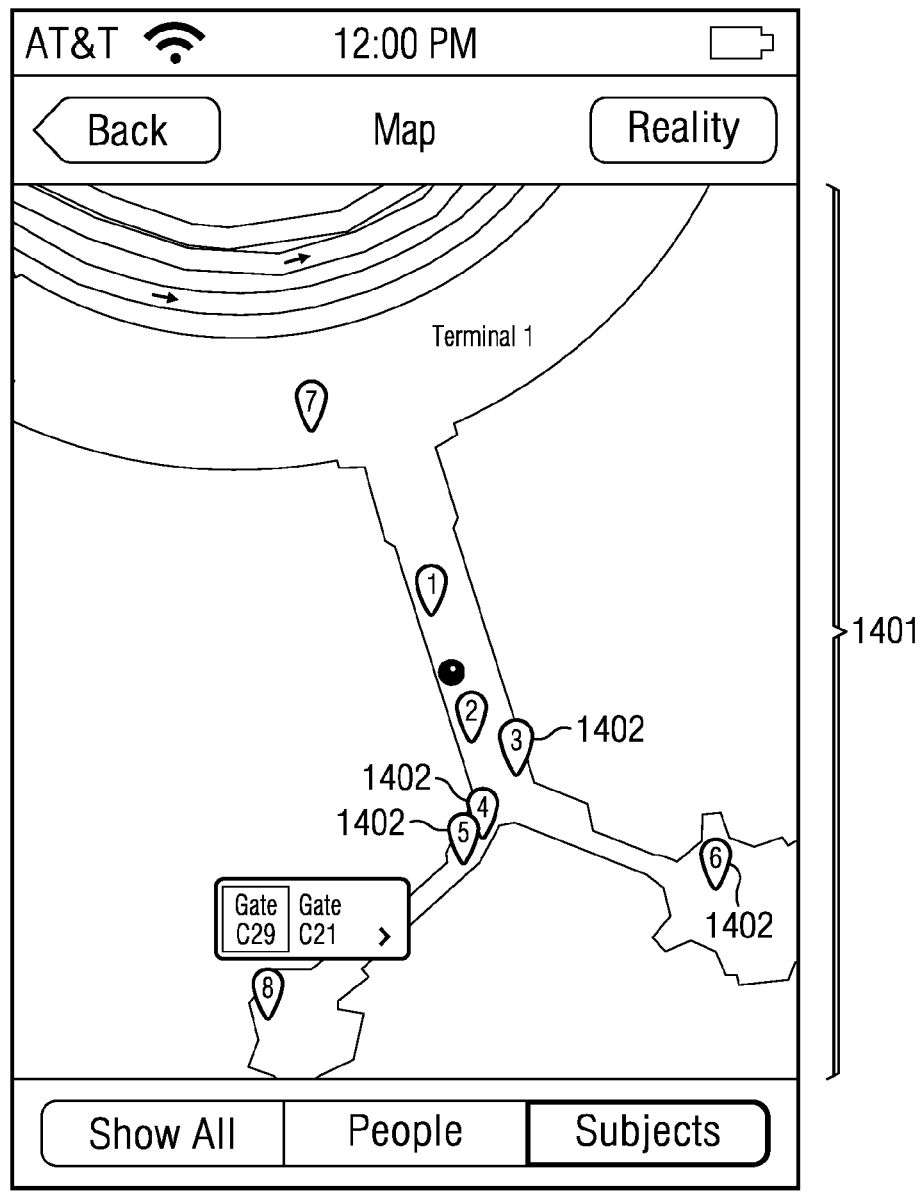
FIG. 14 shows a two-dimensional top view map, but also of colleagues who are associated with a common subject, as well as their locations.

The location-based subjects may be accessed in other ways as shown in FIG. 13 and FIG. 14, which are described in further detail below.

In the example in FIG. 13, the previously described subjects 1202 may be accessed through icons 1302 appearing on a two-dimensional top view map 1301. The same type of conversation around that subject 1202 (such as shown in FIG. 12) could then appear to the user.

Similarly, in the approach of FIG. 14, the subjects may be presented in a two-dimensional top view map, along with indicated colleagues who follow the same subject. The colleagues are indicated by the orange, numbered teardrops 1402 (1 through 7).

By using geolocation features within their mobile terminals in conjunction with the described embodiments herein, users may be able to react to ever-changing conditions on the job, especially when their workspace is a large public area. The geolocation feature may be helpful not only in airports, but also in sports arenas, concert venues, and other large, highly trafficked areas.

In addition to the above described subject navigation, the system described in this application includes communities 113, which provides an added level of control for developing collaborative communication. In particular, each user may be provided with a community 113 within which multiple of the above-described subjects 116 may be followed. For example, a user might be in a "product development" community 113 as well as an "admin" community 113. These communities can be defined within the enterprise such that certain users belong to some communities 113 and not to others, and other users belong to different communities 113. Thus, the communities 113 and subjects 116 provide a layered context for the user to interact with other users.

Figure 15:
FIG. 15 is an event feed screen showing "My Communities" and "Post to Community" options.

The screenshot in FIG. 15 illustrates a user screen where the user can navigate to one of his or her communities 113 by clicking on the "my communities" 113 choices in the lower left hand corner of the screen. Navigating communities allows users to keep information separate, so as to only inform the intended communities without allowing other communities or groups to see the information shared between the user and the intended community.

Figure 16:
FIG. 16 shows posting to a community from the event feed window. The community is listed in the first blank as "Admin."

Additionally, even from the user's home 115 screen, a user can post relevant content from his or her wall 104 to selected communities 113 by clicking on the "post to community" 1501 option below the items shown there. In this way the user can cross-reference relevant content to one or more communities 113 without departing from the current view. An illustration of the functionality for this cross-referencing enabled by this feature is illustrated in FIG. 16.

Various options may be used for placing the addressed communities for the post and could be implemented to affect the functionality. In this instance, as shown in FIG. 16, the content is about to be posted to the "Admin" community 1601 to which the user belongs. From this screen the user may be able to post to one or more of his or her communities to ensure that the correct information is delivered to the correct community securely, without any users other than the users of the recipient community viewing the content.

Figure 17:
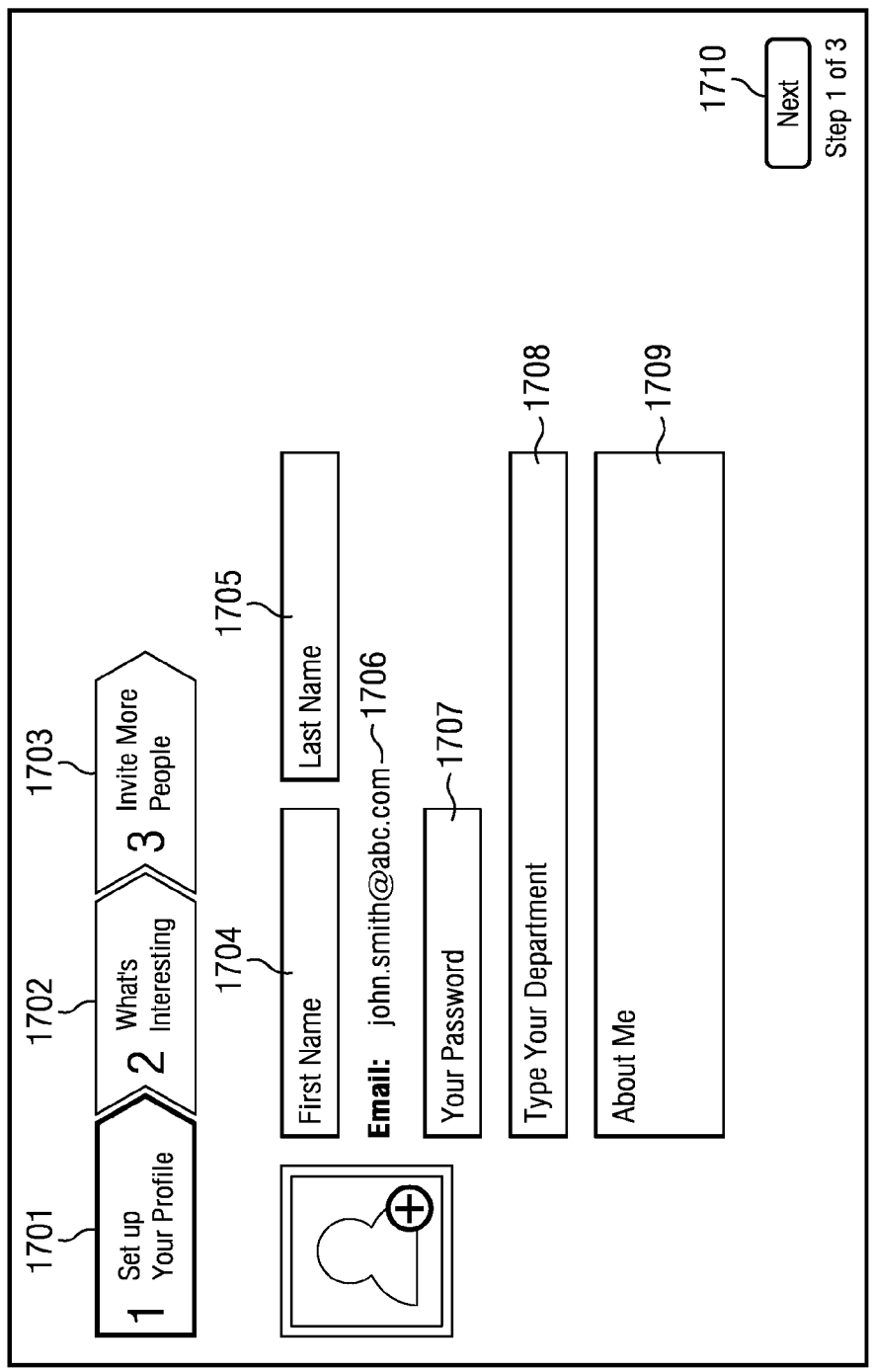
FIG. 17 shows a screenshot of the "set up your profile" page when a user is setting up an account for a dynamic evaluation period.

In operation, a user may sign up for a profile for a dynamic evaluation period as shown in FIG. 17. The user may enter his or her first name 1704, last name 1705, email address 1706, password 1707, department 1708, and a brief description in the "about me" section 1709. In the "about me" section 1709, the user may include his or her job title, interests, and any other pertinent information for evaluation purposes.

Figure 18:
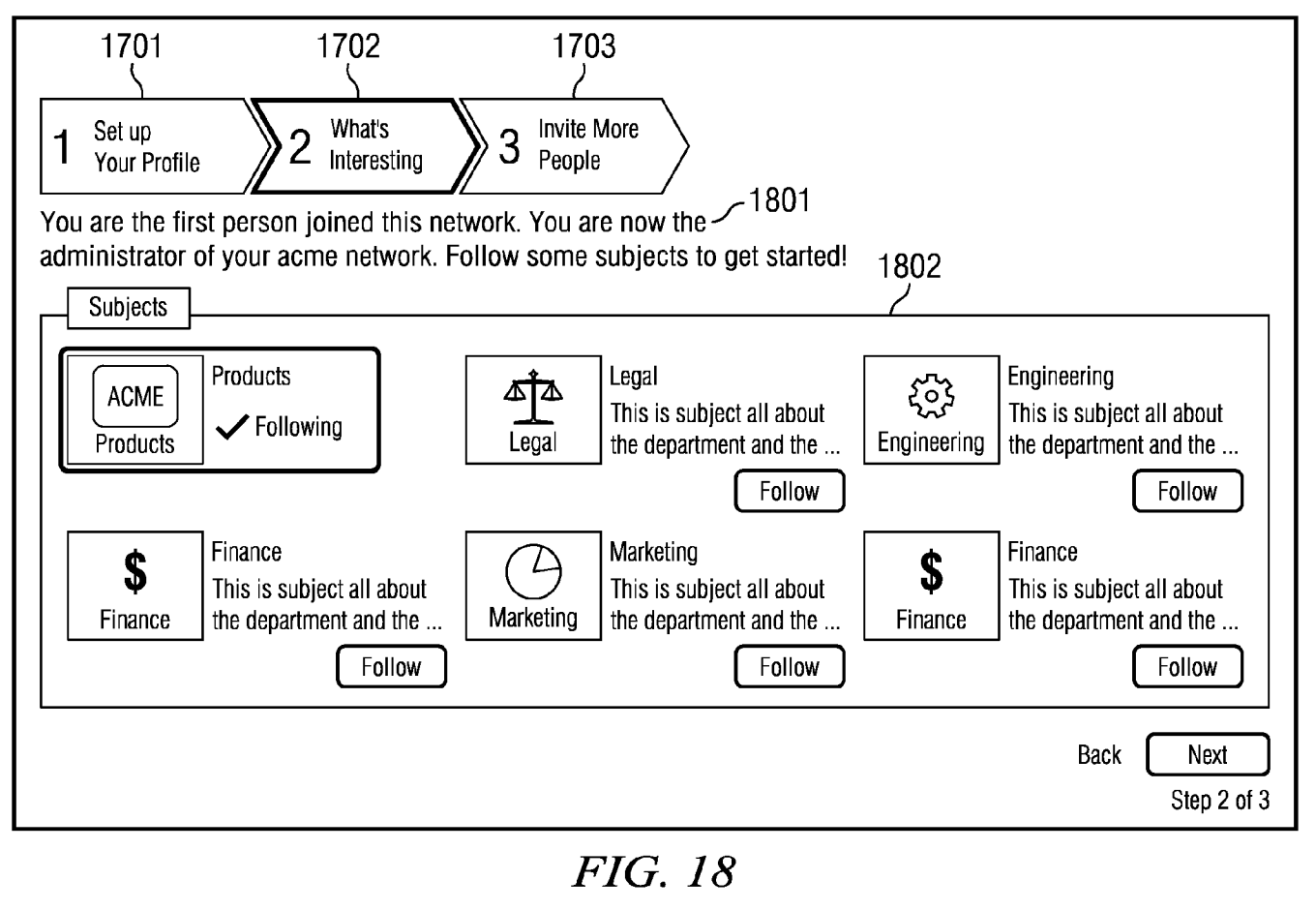

Once the user has entered all of this information, the user may click "next" 1710 and proceed to create a profile for a dynamic evaluation period, as shown in FIG. 18. Certain assigned users, which might in some instances be the first person from his or her organization to create a profile, will become administrators for their organization's enterprise network 1801. As an administrator, a user may be given the opportunity to follow certain subject areas 1802, such as marketing, legal, or engineering, as shown in FIG. 18. Administration functions are further described below.

Figure 19:
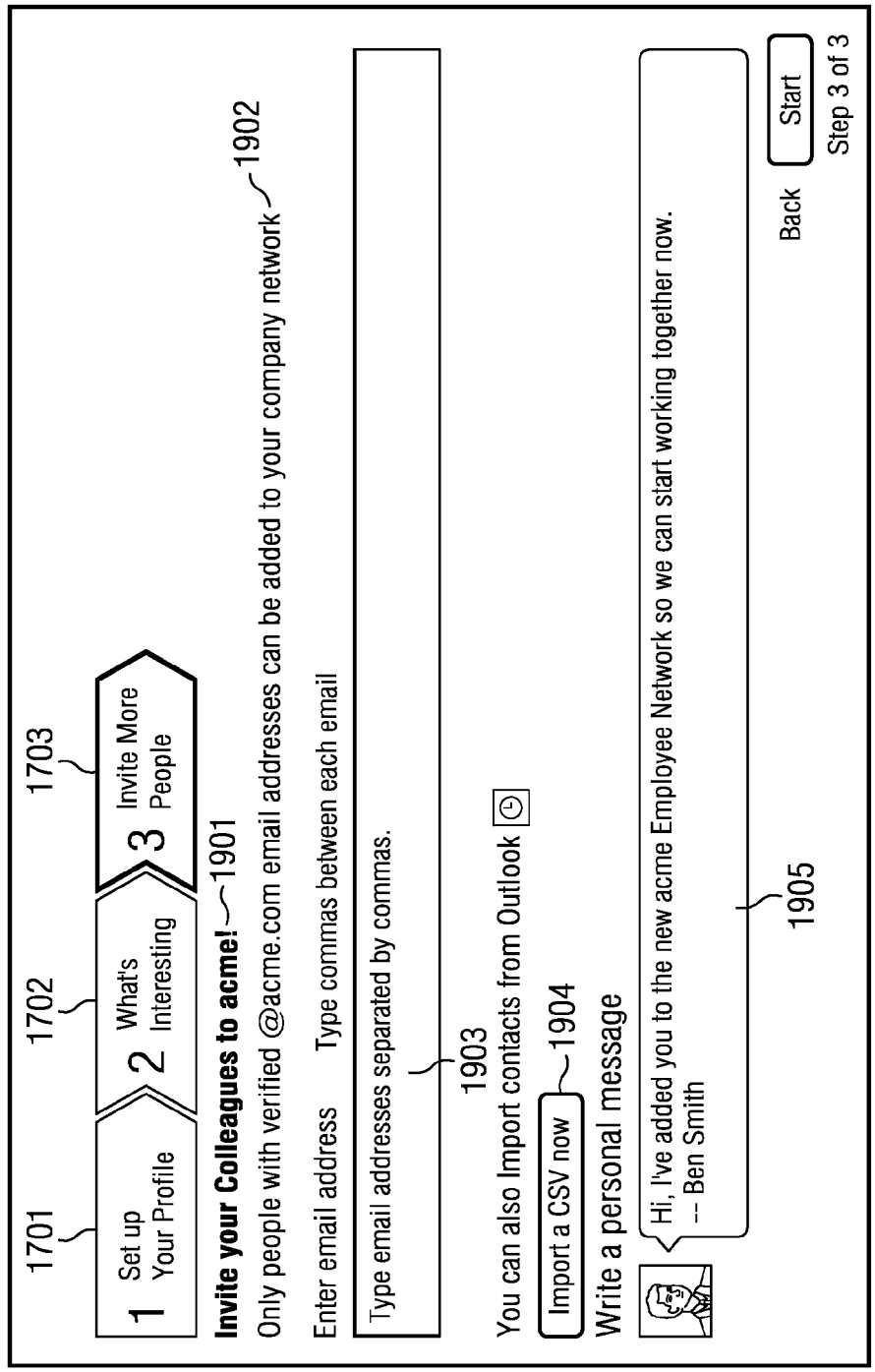
FIG. 19 shows a screenshot of the "Invite more people" page when a user is setting up an account for the dynamic evaluation period.

Once established as the administrator of the enterprise network, the user may invite colleagues 1901 to establish their own profiles for the dynamic evaluation period, as shown in FIG. 19. The application may only allow the administrator to invite colleagues with verified email addresses from the same company 1902 to be a part of the company's network. For example, in the screenshot shown in FIG. 19, the administrator is an employee of Example Company with an @examplecompany.com email address. As an employee of Example Company, the administrator may only invite those colleagues who also have an @examplecompany.com email address to be a part of the Example Company enterprise network. When inviting colleagues, the administrator may enter email addresses 1903 directly or may import his or her contacts 1904 from Outlook or any other network, such as Facebook, Twitter, and LinkedIn. In addition, the administrator may enter a personal message 1905 to be sent to the colleagues who the administrator chooses to invite to the company network. Once a colleague is invited to join the company network by the administrator, the colleague may receive an email invitation from the administrator to join the company network, as shown in FIG. 20 and described below.

Figure 20:
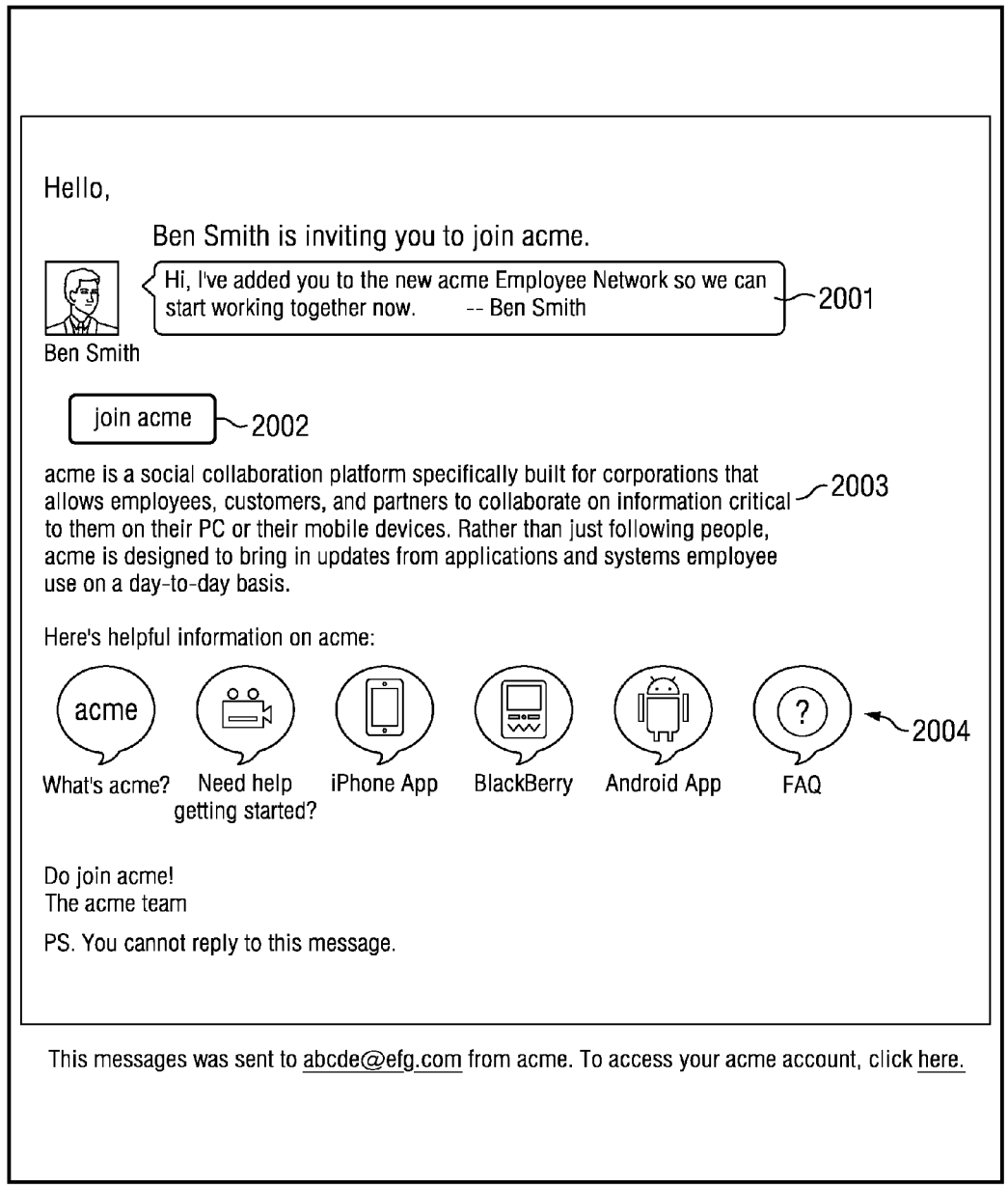
FIG. 20 shows a screenshot of an exemplary email when someone from the enterprise network sends an invitation to join the enterprise network.

As shown in FIG. 20, the email invitation from the administrator to a colleague may include a personal message 2001 from the administrator. The colleague may then join the company's enterprise network directly from the email by clicking on a hyperlink 2002 to the enterprise network. The email may also include helpful information 2004 and/or a brief description 2004 about the enterprise network. The helpful information 2004 section may include hyperlinks to download applications for iPhone, BlackBerry, or Android phones and a FAQ section.

Figure 21:
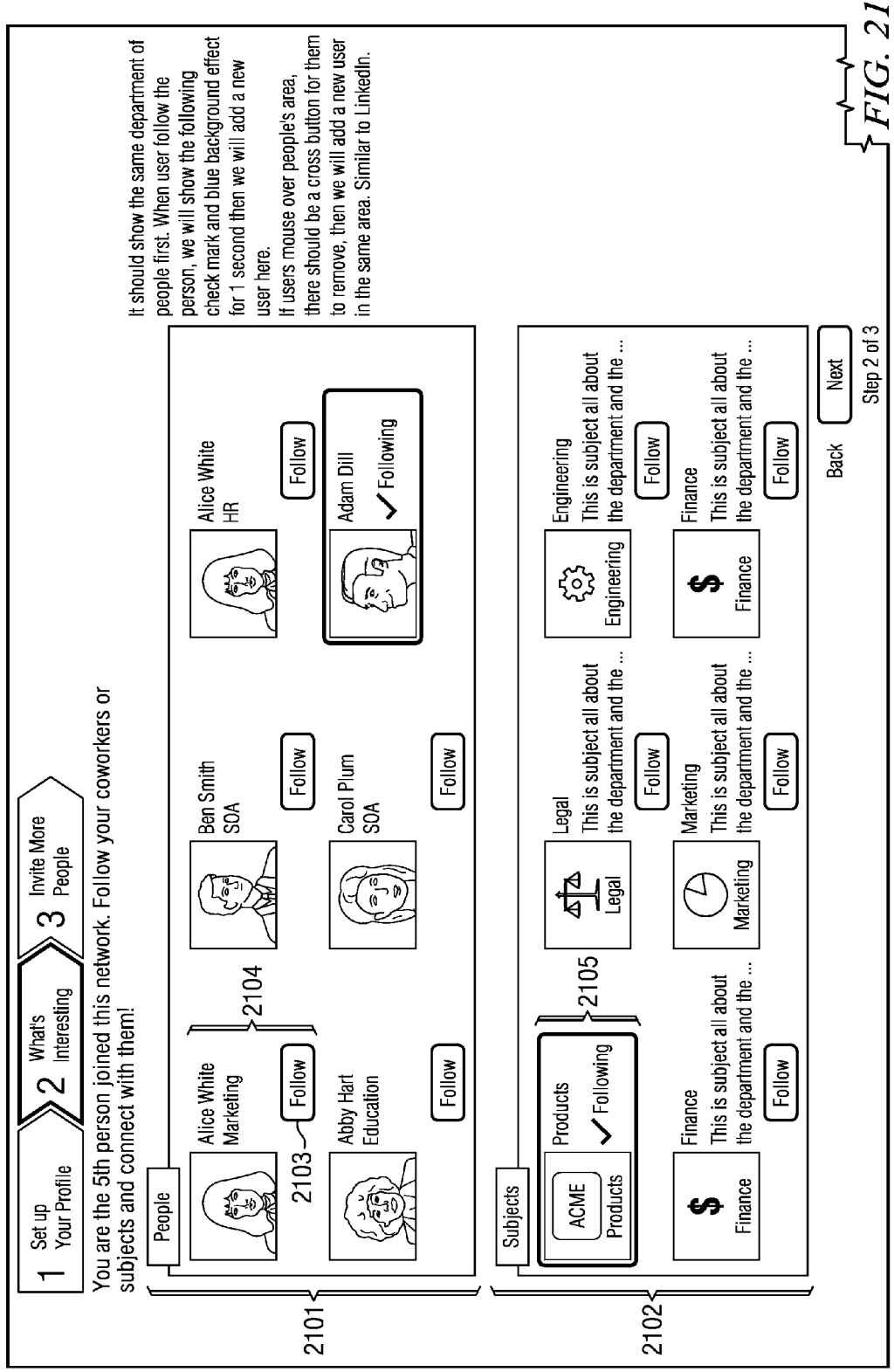
FIG. 21 shows the "What's interesting" page of the setup to join the enterprise network if a new user is not the first member of their company to join the enterprise network.

If the user is not the first person from his or her organization to create a profile, as in the case of receiving an email invitation from a colleague, this new user may be given the opportunity to follow colleagues 2101 within their organization who have already established profiles, as shown in FIG. 21. As discussed earlier, all of the users from a specific organization may be partitioned behind a wall. In addition, the user may be given the opportunity to follow certain subject areas 2102, such as marketing, engineering, legal, etc. By following certain subjects 2102, the user may be connected to other users, both within the organization and outside the organization, who have similar interests.

When choosing which colleagues 2101 and/or subjects 2102 to follow, the user may click a colleague's name to see a more detailed profile 2104 of the colleague, or on a subject to see some of the discussions in that subject 2105. These approaches are described further below.

For example, in FIG. 21, a user may click on "Abby's" name icon 2101a to see Abby's more detailed profile. Based on this profile information, the user may determine whether or not to follow 2103 Abby in his or her company's network. In FIG. 21, a user may click on the "products" subject 2102a to see the current discussion in the "products" subject area.

Figure 22:
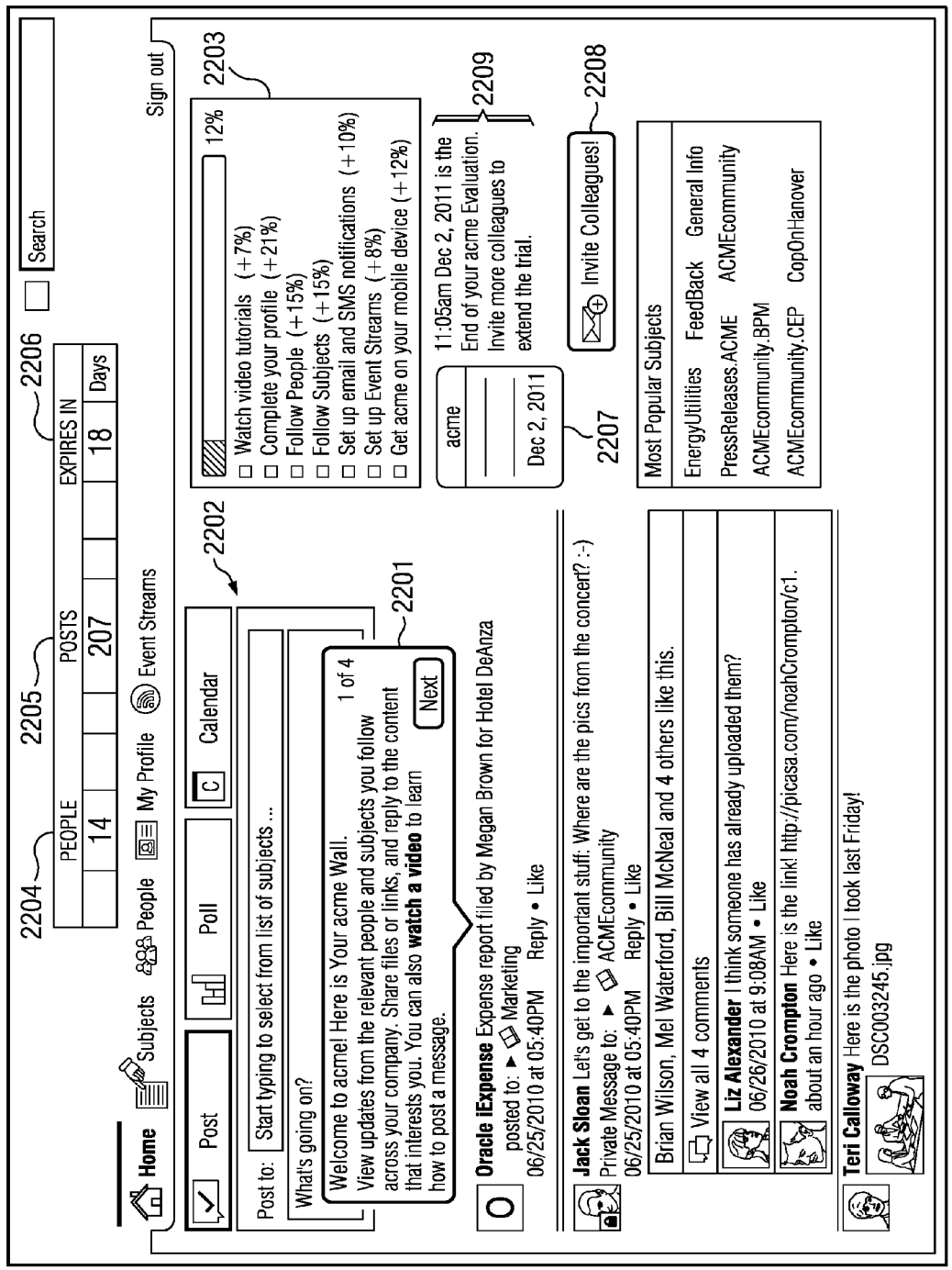
FIG. 22 is a screenshot of a new user's home screen showing the user's wall with helpful hints to orient the user in the enterprise network.

At the next step of creating a profile for a dynamic evaluation period, as shown in FIG. 22, once the user has created a profile, the user may be directed to the wall 104 for his or her personalized home page on the enterprise network. The first time the user views the user's own profile, a welcome message 2201 may be displayed.

As described previously, the profile may include the user's followers 101, who the user is following 102, and messages 103. The user's wall 104 may also include the options to post messages 2202, go to other users' walls, send private messages 106, edit notification settings 2203, and view chat histories 107 and event streams 111.

Each organization may have their own enterprise network partitioned off and away from other organizations' enterprise networks. Members of an organization, whether a company, non-profit organization, educational institution, or group of professionals within the same profession, may only see their fellow members from the same organization. While users may invite people from outside their organizations to join the enterprise network, which process would be handled by the enrollment server 230 (see FIG. 2A), the new users may be "on their own" behind a separate partition and may then invite new users from their own organizations to join the enterprise network.

Behind each organization's partition, each new user may start out with a specific number of days for his or her evaluation period. For example, new users may initially be given 15 days to use, test, and evaluate the application. Based on the user's or organization's use of the application, one or more of the users' evaluation periods may be extended by incentivizing users to participate in the evaluation. For example, users may extend their evaluation periods by a week every time they invite ten new users to join the network or make ten posts on the enterprise network wall. Unlike networking sites such as Facebook, Twitter, and LinkedIn, which have few or no evaluation concepts tied to them, the present application may dynamically extend the period of time that a user uses the network based on the quantity and quality of evaluation feedback received from the users comprising an organization's enterprise network.

The application may rely on gaming techniques to encourage increased participation through group dynamics. Awards may be given to users who invite the most colleagues to join their organization's enterprise network, to those who post the most entries on the network's walls, to those who post on specific subject matters, and to those who give the best feedback. All of the awards may be explicitly provided as a result of the user reaching a certain predetermined level, such as inviting ten people to join their enterprise network, or may be implicitly provided in order to surprise and excite users when they take an action that the application desires, such as when they provide feedback on a certain subject. By allowing users within an organization to see every other user's awards, the group dynamic may encourage and/or incentivize other users to strive to receive awards of their own. Awards may be depicted in the network by badges displayed on the user's profile or in a separate badge tray, for example.

Levels or dimensions of awards may also be given based on a user's level of expertise within an organization. A first level of awards may be based on a user's level of participation within the enterprise network. For example, a user may be a beginner, intermediate, advanced, or expert user within the network based on their number of invites, number of wall posts, etc. A second level of awards may be based on the user's role within the organization. This level may be self-described or may be based on the subjects in which the user participates. For example, a user may be described as a sales specialist or a marketing expert based on the subjects in which the user participates. A third level of awards may be based on the user's level of participation within the enterprise network. For example, if a user repeatedly answers questions on his or her network, the user may be labeled a "problem solver," whereas if a user repeatedly asks questions that start a chain of conversation, the user may be labeled a "conversation starter." Each level of awards may be used in the organization or within the application to target specific employees who may be of value to the organization and/or application for evaluative purposes.

Also shown in FIG. 22, the user's profile may include additional functionality such as the date when the evaluation period is currently set to expire 2207, the number of days in which the evaluation period is set to expire 2206, the number of people who have recently joined the company's enterprise network 2204, and the number of posts made to the enterprise network 2205. In this example, the user's evaluation period is set to expire in 18 days 2206 on December 2, 2207, there are 14 people who have recently joined the company's enterprise network 2204, and there have been 207 posts to the company's enterprise network 2205. The user may click on the number of people to see who has joined the network recently 2204, the number of posts 2205 to see the most recent posts made, and the number of days in which the evaluation period is set to expire 2206 in order to see how many new colleagues the user needs to invite to join the enterprise network to extend his or her evaluation period.

As can be seen in FIG. 22, next to the date that the evaluation period is set to expire 2207, the user may invite colleagues 2208 to join his or her organization's enterprise network. By inviting colleagues to join, the user may extend his or her, as well as the organization's, evaluation period by one or more days, which incentivizes users to invite their colleagues to join the enterprise network.

Figure 23:
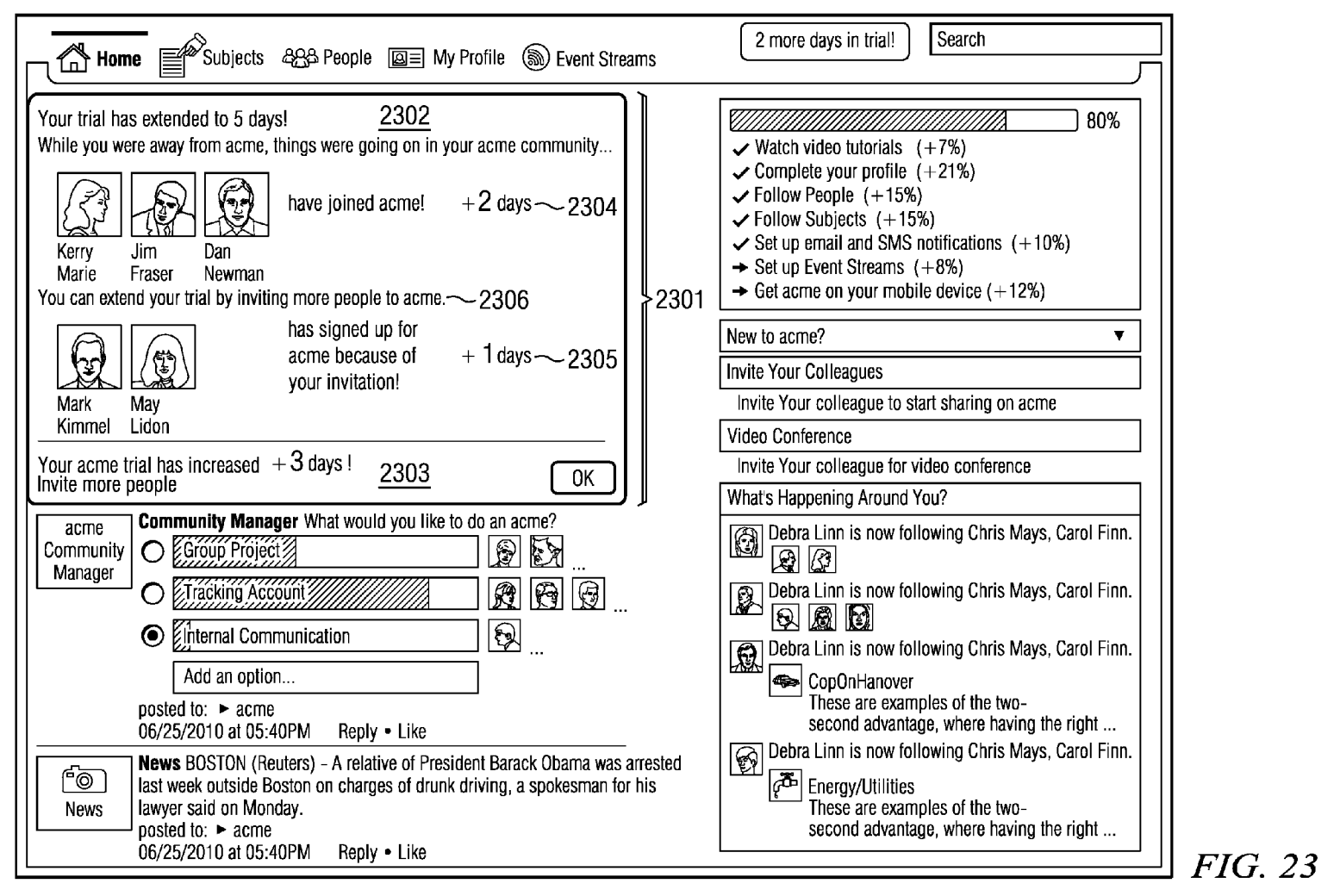

As shown in FIG. 23, when a user signs in to the application, a status screen 2301 may be presented to the user. For example, the status screen may state that while the user has been away from the application, the trial evaluation period has been extended to five days 2302. In the screenshot shown in FIG. 23, the trial evaluation period has been extended three additional days 2303—two days because three additional people have joined the organization's enterprise network 2304 and one day because two new people have signed up for the enterprise network as a result of the user's email invitations 2305. The user is also reminded that the organization's evaluation period may be extended by inviting more people to join the enterprise network 2306.

The application may also include a help feature 2405, as shown in FIG. 24. For example, the help feature 2405 may include tutorial videos 2401, featured videos 2402, a question and answer section 2403, and an expandable frequently asked questions section 2404. The user may click on each frequently asked question 2404 to see an answer to the question. The help section 2405 may also include a feature where a user may ask a customer support staff individual a specific question not already answered in the frequently asked questions section 2405 by clicking the "Contact Us" button 2406.

While not depicted, the application may be interoperable with other networks such as Facebook, Twitter, and LinkedIn. That is, each time a user in the enterprise network posts a new post on his or her wall 104 about a subject 116, for example, the user's Facebook, Twitter, and LinkedIn accounts may also reflect that the user was active on the enterprise network. By updating the user's Facebook, Twitter, and LinkedIn accounts, the user's friends, followers, and connections, respectively, may desire to join the enterprise network. If the new user is a member of an organization that already has an enterprise network, that new user may be added to the existing network. If, on the other hand, the new user is not a member of an organization that has an enterprise network, that new user may become the administrator of a new enterprise network behind a separate partition.

The application may also include a calendar feature (not shown). The calendar feature may depict on a calendar how many days are currently remaining in the evaluation period and how many days have been added to the evaluation period. The calendar feature may also include additional designations on specific dates that may become goals for the organization. For example, if the evaluation period is set to expire on December 1, December 3 may include a designation stating the user can extend their organization's evaluation period by two days if the user invites three more users to join the company's enterprise network.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow machines to share resources. Also as referred to herein, a server is a machine deployed to execute a program operating as a socket listener and may include software instances.

Resources may encompass any type of resource for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include but is not limited to computing grid systems, distributed computing environments, cloud computing environment, etc. Such networked computing environments include hardware and software infrastructures configured to form a virtual organization comprised of multiple resources that may be in geographically disperse locations.

While TCP/IP communication protocols may be described herein, the coverage of the present application and any patents issuing there from may extend to other communications protocols.

Various terms used herein have special meanings within the present technical field. Whether a particular term should be construed as such a "term of art" depends on the context in which that term is used. "Connected to," "in communication with," "associated with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

The invention claimed is:

1. An enterprise-focused network system, the system comprising:
    a) a client interface operable to communicate with one or more internet-based or mobile client machines;
    b) an enrollment server in communication with the client interface, the enrollment server operable to communicate with the client interface and to provide for new user enrollment with the enterprise-focused network system;
    c) a database in communication with the client interface and the enrollment server, the database operable to store user community records and profile information for users;
    d) a user stream server in communication with the client interface, the user stream server operable to provide user-specific news feeds to users through the client interface to the one or more internet-based or mobile client machines;
    e) an enterprise application interface, the enterprise application interface operable to facilitate coordination between enterprise servers outside the enterprise-focused network system, whereby the client interface provides enterprise-focused network information that includes contextually focused updates from the enterprise servers outside the enterprise-focused network system; and
    f) a network processing machine in communication with the client interface, the enrollment server, the database, the user stream server, and the enterprise application interface, the network processing machine operable to present contextualized, enterprise-based user home pages to users according to their profile information.

2. The enterprise-focused network system of claim 1, in which the enrollment server, the user stream server, and the network processing machine are separate physical machines.

3. The enterprise-focused network system of claim 1, in which the network processing machine is further operable to process geolocation-based information associated with multiple users or client machines and to provide contextual geolocation-based subjects or communities to the one or more internet-based or mobile client machines based at least in part upon the processed geolocation-based information.

4. The enterprise-focused network system of claim 1, wherein the user stream server is operable to provide streams generated by the one or more internet-based or mobile client machines interacting directly with the enterprise-focused network system and an external stream received through the enterprise application interface.

5. The enterprise-focused network system of claim 4, wherein the external stream is one of a Salesforce stream, an SAP stream, an Oracle Order Management stream, and an Oracle Expenses stream.

6. The enterprise-focused network system of claim 1, wherein the user stream server is operable to provide streams generated by the one or more internet-based or mobile client machines interacting directly with the enterprise-focused network system and an external stream received from a life stream source.

7. The enterprise-focused network system of claim 6, wherein the life stream source is one of a Facebook stream, a LinkedIn stream, and a Twitter stream.

8. The enterprise-focused network system of claim 1, further comprising a video conferencing server operable to communicate with the network processing machine to enable the instantiation of contextual video conferencing services among users connected by certain common subjects.

9. The enterprise-focused network system of claim 8, wherein the certain common subjects are subjects coordinated with enterprise applications through the enterprise application interface.

10. The enterprise-focused network system of claim 1, wherein the enrollment server is further operable to communicate with the network processing machine to encourage new user enrollment through gaming techniques.

11. A method for providing a collaborative enterprise-focused communications network, the method comprising:
    a) providing a client interface operable to communicate with one or more internet-based or mobile client machines;
    b) providing an enrollment server in communication with the client interface, the enrollment server operable to communicate with the client interface and to provide for new user enrollment with the enterprise-focused network system;
    c) providing a database in communication with the client interface and the enrollment server, the database operable to store user community records and profile information for users;
    d) providing an enterprise application interface, the enterprise application interface operable to facilitate coordination between enterprise servers outside the enterprise-focused communications network and to receive contextually focused updates from enterprise applications running on the enterprise servers; and
    e) providing user streams through the client interface to the one or more internet-based or mobile client machines, the user streams comprising user-specific news feeds, the user-specific news feeds based at least in part on the contextually focused updates received from the enterprise applications.

12. The method of claim 11, further comprising processing geolocation-based information associated with users or client machines and providing contextual geolocation-based subjects or communities to the one or more internet-based or mobile client machines based at least in part upon the processed geolocation-based information.

13. The method of claim 11, wherein the enterprise applications include one of Salesforce, SAP, Oracle Order Management, and Oracle Expenses.

14. The method of claim 11, further comprising integrating life stream information in the user streams provided through the client interface.

15. The method of claim 14, wherein the life stream information includes life stream sources from one of Facebook, LinkedIn, and Twitter.

16. The method of claim 11, further comprising providing a video conferencing server operable to enable instantiation of contextual video conferencing services among users connected by certain common subjects.

* * * * *